US009487965B2

(12) United States Patent
Volin

(10) Patent No.: US 9,487,965 B2
(45) Date of Patent: Nov. 8, 2016

(54) AUTOMATIC-WATER-SHEDDING HEIGHT-ADJUSTABLE THREE-DIMENSIONALLY-ADJUSTABLE POST-BASE SYSTEM

(71) Applicant: Dee Volin, Fairview, OR (US)

(72) Inventor: Dee Volin, Fairview, OR (US)

( * ) Notice: Subject to any disclaimer, the term of this patent is extended or adjusted under 35 U.S.C. 154(b) by 0 days.

(21) Appl. No.: 15/089,502

(22) Filed: Apr. 2, 2016

(65) Prior Publication Data
US 2016/0289993 A1 Oct. 6, 2016

Related U.S. Application Data

(60) Provisional application No. 62/143,014, filed on Apr. 3, 2015.

(51) Int. Cl.
E04H 12/22 (2006.01)
F16B 39/282 (2006.01)
F16B 25/10 (2006.01)
E04H 17/22 (2006.01)
F16B 5/02 (2006.01)
F16B 43/02 (2006.01)

(52) U.S. Cl.
CPC ...... *E04H 12/2284* (2013.01); *E04H 12/2261* (2013.01); *E04H 12/2292* (2013.01); *E04H 17/22* (2013.01); *F16B 5/0233* (2013.01); *F16B 25/103* (2013.01); *F16B 39/282* (2013.01); *F16B 43/02* (2013.01)

(58) Field of Classification Search
CPC ... E04H 12/22; E04H 17/22; E04H 12/2261; E04H 12/2284; E04H 12/2238; E04H 17/20; E04H 12/2292; E02D 27/42; G16B 43/02; F16B 5/0233; F16B 43/00; F16B 25/103
USPC .......................................... 411/537, 546, 531
See application file for complete search history.

(56) References Cited

U.S. PATENT DOCUMENTS

| 3,253,373 | A | | 5/1966 | Diack | |
|---|---|---|---|---|---|
| 3,671,738 | A | | 6/1972 | Beachley | |
| 3,837,752 | A | | 9/1974 | Shewchuk | |
| 4,007,564 | A | * | 2/1977 | Chisholm | E04H 12/22 403/186 |
| 4,079,559 | A | * | 3/1978 | Tenbrummeler | E04H 12/187 248/519 |

(Continued)

*Primary Examiner* — Adriana Figueroa
*Assistant Examiner* — Jessie Fonseca

(57) ABSTRACT

An automatic-water-shedding height-adjustable three-dimensionally-adjustable fence-post-base system comprises automatic-water-shedding three-dimensionally-adjustable tapping-screw systems, automatic-water-shedding height-adjustable tube-screw systems, and an automatic-water-shedding height-adjustable three-dimensionally-adjustable base system. Each tapping-screw system has a convex head bottom for three-dimensionally adjusting the fence-post-base system when screwed into a foundation, and has a circular water-sealing ridge for preventing water from flowing into the underside of a foundation. Each tube-screw system has a circular water-sealing dike for automatically preventing water from flowing into the underside of a foundation, and has a circular rain-water reservoir and channels for draining water away. The automatic-water-shedding three-dimensionally-adjustable base system has multiple rain-water reservoirs and ducts for draining water away to prevent corrosion and the growth of mold, and has water-evaporation-inducing-and-water-draining-inducing pads for lifting the fence-post-base system, for allowing air to freely circulate therethrough, and for allowing water to drain and evaporate away from the fence-post-base system.

20 Claims, 21 Drawing Sheets

(56) References Cited

U.S. PATENT DOCUMENTS

| | | | |
|---|---|---|---|
| 4,154,037 A | 5/1979 | Anderson | |
| 4,295,308 A | 10/1981 | Korfanta | |
| 4,367,864 A | 1/1983 | Eldeen | |
| 4,793,111 A * | 12/1988 | Shewchuk | E04H 12/08 256/59 |
| 4,854,549 A | 8/1989 | Roberts | |
| 5,116,004 A | 5/1992 | Luecke | |
| 5,419,538 A | 5/1995 | Nicholas | |
| 5,467,569 A | 11/1995 | Chiodo | |
| 5,505,033 A | 4/1996 | Matsuo | |
| 5,660,362 A | 8/1997 | Selby | |
| 5,772,356 A | 6/1998 | Collins | |
| 5,862,635 A | 1/1999 | Linse | |
| 5,878,540 A | 3/1999 | Morstein | |
| 6,015,138 A | 1/2000 | Kohlberger | |
| 6,332,292 B1 | 12/2001 | Buzon | |
| 6,336,620 B1 | 1/2002 | Bell | |
| 6,363,685 B1 | 4/2002 | Kugler | |
| 6,513,291 B2 | 2/2003 | Gilsdorf | |
| 6,520,471 B2 | 2/2003 | Jones | |
| 6,588,717 B2 | 7/2003 | Carnahan | |
| 6,604,330 B2 | 8/2003 | Repasky | |
| 6,729,089 B1 | 5/2004 | Spragg | |
| 6,871,455 B1 | 3/2005 | Cockman | |
| D547,463 S | 7/2007 | Gross | |
| 7,241,079 B2 | 7/2007 | Francis | |
| 7,296,386 B2 | 11/2007 | Leek | |
| 7,513,083 B2 | 4/2009 | Pryor | |
| 7,631,409 B2 | 12/2009 | Dehlsen | |
| 7,918,059 B2 | 4/2011 | Repasky | |
| 8,082,702 B2 | 12/2011 | Hill | |
| 8,096,368 B1 | 1/2012 | Rider | |
| 8,235,346 B2 | 8/2012 | Bakos | |
| 8,567,743 B2 | 10/2013 | Ehrhardt | |
| 8,826,629 B1 | 9/2014 | Brindle | |
| 8,920,077 B2 | 12/2014 | Kruse | |
| 9,091,037 B2 | 7/2015 | Fairbairn | |
| 9,097,017 B1 | 8/2015 | Vanlennep | |
| D739,563 S | 9/2015 | Whiteley | |
| 9,145,706 B2 | 9/2015 | Lee | |
| 9,255,409 B2 | 2/2016 | Moore | |
| 2004/0033120 A1* | 2/2004 | Ducker, III | F16B 33/004 411/82.1 |
| 2006/0022189 A1 | 2/2006 | Collins, IV | |
| 2006/0142402 A1 | 6/2006 | Dunnrowicz | |
| 2006/0175595 A1 | 8/2006 | Carnevali | |
| 2007/0158526 A1* | 7/2007 | Platt | E04H 12/2284 248/519 |
| 2007/0187564 A1* | 8/2007 | McGuire | E02D 27/42 248/346.5 |
| 2008/0222973 A1 | 9/2008 | Lee | |
| 2008/0237560 A1 | 10/2008 | Dehlsen | |
| 2009/0134289 A1* | 5/2009 | Godwin | E04C 3/32 248/218.4 |
| 2009/0266016 A1* | 10/2009 | Kraft | E02D 27/42 52/296 |
| 2009/0272053 A1* | 11/2009 | Dent | E02D 27/32 52/296 |
| 2012/0006964 A1* | 1/2012 | Bergman | E04H 12/2269 248/523 |
| 2012/0131879 A1* | 5/2012 | Bergman | E04F 11/1812 52/704 |
| 2012/0192507 A1* | 8/2012 | Paananen | E04H 12/2215 52/155 |
| 2012/0324825 A1 | 12/2012 | Vrame | |
| 2013/0048825 A1* | 2/2013 | Stalemark | B23B 47/28 248/534 |
| 2013/0061453 A1* | 3/2013 | Rosendahl | E04H 5/04 29/525.11 |
| 2015/0082719 A1* | 3/2015 | Takahashi | E04B 1/40 52/298 |
| 2015/0113893 A1 | 4/2015 | Patterson | |
| 2015/0191929 A1 | 7/2015 | Takahashi | |
| 2015/0259913 A1* | 9/2015 | Tanaka | E04C 3/32 52/296 |
| 2016/0222662 A1* | 8/2016 | Tanaka | E04B 1/2403 |
| 2016/0237681 A1* | 8/2016 | Tanaka | E04H 9/021 |

* cited by examiner

AUTOMATIC-WATER-SHEDDING HEIGHT-ADJUSTABLE THREE-DIMENSIONALLY-ADJUSTABLE POST-BASE SYSTEM

Provisional Patent Application No. 62/143,014 was filed on Apr. 3, 2015.

1. Field of the Invention

The present invention relates to a fence-post base for attaching a fence post to a patio, a pool floor, etc. (such as, concrete, wood, tile, or composite surface). Particularly, the present invention relates to a unique automatic-water-shedding height-adjustable three-dimensionally-adjustable fence-post-base system, which has:
  a) Water-sealing ridges and dikes,
  b) Water-draining reservoirs and sumps,
  c) Water-draining channels and ducts,
  d) Fence-post-base-lifting pads,
  e) Base-height-adjusting tube screws, and
  f) Tube-screw-locking teeth
to shed and drain rainwater away from the unique automatic-water-shedding height-adjustable three-dimensionally-adjustable fence-post-base system,
to allow rainwater to evaporate away from under unique automatic-water-shedding height-adjustable three-dimensionally-adjustable fence-post-base system, and
to lock unique automatic-water-shedding height-adjustable three-dimensionally-adjustable fence-post-base system to a foundation.

2. Description of the Prior Art

A number of fence-post bases have been introduced.

U.S. Pat. No. 3,253,373, issued 1966 May 31, to Arthur G. Diack;
U.S. Pat. No. 3,671,738, issued 1972 Jun. 20, to Robert W. Beachley;
U.S. Pat. No. 3,837,752, issued 1974 Sep. 24, to John Shewchuk;
U.S. Pat. No. 4,154,037, issued 1979 May 15, to Frohman C. Anderson;
U.S. Pat. No. 4,295,308, issued 1981 Oct. 20, to Carl Korfanta;
U.S. Pat. No. 4,367,864, issued 1983 Jan. 11, to Gene H. Eldeen;
U.S. Pat. No. 4,854,549, issued 1989 Aug. 8, to William F. Roberts;
U.S. Pat. No. 5,116,004, issued 1992 May 26, to Francis S. Luecke;
U.S. Pat. No. 5,419,538, issued 1995 May 30, to Thomas N. Nicholas;
U.S. Pat. No. 5,467,569, issued 1995 Nov. 21, to Daniel J. Chiodo;
U.S. Pat. No. 5,505,033, issued 1996 Apr. 9, to Hideshige Matsuo;
U.S. Pat. No. 5,660,362, issued 1997 Aug. 26, to Theodore W. Selby;
U.S. Pat. No. 5,772,356, issued 1998 Jun. 30, to Samuel W. Collins;
U.S. Pat. No. 5,862,635, issued 1999 Jan. 26, to Robert P. Linse;
U.S. Pat. No. 5,878,540, issued 1999 Mar. 9, to Jerome N. Morstein;
U.S. Pat. No. 6,015,138, issued 2000 Jan. 18, to Walter Kohlberger;
U.S. Pat. No. 6,332,292, issued 2001 Dec. 25, to Claude Buzon;
U.S. Pat. No. 6,336,620, issued 2002 Jan. 8, to John A. Bell;
U.S. Pat. No. 6,363,685, issued 2002 Apr. 2, to William E. Kugler;
U.S. Pat. No. 6,513,291, issued 2003 Feb. 4, to David R. Gilsdorf;
U.S. Pat. No. 6,520,471, issued 2003 Feb. 18, to Nigel A. S. Jones;
U.S. Pat. No. 6,588,717, issued 2003 Jul. 8, to Garnett Carnahan;
U.S. Pat. No. 6,604,330, issued 2003 Aug. 12, to John Repasky;
U.S. Pat. No. 6,729,089, issued 2004 May 4, to Robert J. Spragg;
U.S. Pat. No. 6,871,455, issued 2005 Mar. 29, to Norman F. Cockman;
U.S. Pat. No. 7,241,079, issued 2007 Jul. 10, to Colin W. Francis;
U.S. Pat. No. 7,296,386, issued 2007 Nov. 20, to William F. Leek;
U.S. Pat. No. 7,513,083, issued 2009 Apr. 7, to Steven E. Pryor;
U.S. Pat. No. 7,631,409, issued 2009 Dec. 15, to Brian Dehlsen;
U.S. Pat. No. 7,918,059, issued 2011 Apr. 5, to John Repasky;
U.S. Pat. No. 8,082,702, issued 2011 Dec. 27, to Ian A. Hill;
U.S. Pat. No. 8,096,368, issued 2012 Jan. 17, to Stephen B. Rider;
U.S. Pat. No. 8,235,346, issued 2012 Aug. 7, to Stephen M. Bakos;
U.S. Pat. No. 8,567,743, issued 2013 Oct. 29, to Joseph P. Ehrhardt;
U.S. Pat. No. 8,826,629, issued 2014 Sep. 9, to David R. Brindle;
U.S. Pat. No. 8,920,077, issued 2014 Dec. 30, to Darin Kruse;
U.S. Pat. No. 9,091,037, issued 2015 Jul. 28, to Mark H. Fairbairn;
U.S. Pat. No. 9,097,017, issued 2015 Aug. 4, to Hector Vanlennep;
U.S. Pat. No. 9,145,706, issued 2015 Sep. 29, to Richard Lee;
U.S. Pat. No. 9,255,409, issued 2016 Feb. 9, to David Moore;
U.S. Pat. No. D547,463, issued 2007 Jul. 24, to John Gross;
U.S. Pat. No. D739,563, issued 2015 Sep. 22, to Christopher J. Whiteley;
U.S. Publication No. 20060022189, published 2006 Feb. 2, to Earle S. Collins IV;
U.S. Publication No. 20060142402, published 2006 Jun. 29, to Clarence J. Dunnrowicz;
U.S. Publication No. 20060175595, published 2006 Aug. 10, to Jeffrey D. Carnevali;
U.S. Publication No. 20080222973, published 2008 Sep. 18, to Alan S. G. Lee;
U.S. Publication No. 20080237560, published 2008 Oct. 2, to Brian Dehlsen;
U.S. Publication No. 20120324825, published 2012 Dec. 27, to Peter A. Vrame;
U.S. Publication No. 20150113893, published 2015 Apr. 30, to Kelly Patterson; and
U.S. Publication No. 20150191929, published 2015 Jul. 9, to Hideaki Takahashi disclose a variety of inventions related to fence-post bases.

Disadvantages of the Prior Art

The prior art have failed to solve many problems associated with such fence-post base, as follows:

1) No prior art mention or disclose any fence-post base, having
   automatic-water-shedding three-dimensionally-adjustable tapping-screw convex head bottom 104 and
   automatic-water-shedding height-adjustable tube-screw concave head top 111.
   Therefore, the prior art of fence-post base:
   a) Can not allow automatic-water-shedding three-dimensionally-adjustable tapping-screw systems 101 to rotate 360 degrees
       to adjust the elevation of the unique automatic-water-shedding height-adjustable three-dimensionally-adjustable fence-post-base system;
   b) Can not allow automatic-water-shedding three-dimensionally-adjustable tapping-screw systems 101 to lean in any direction
       to three-dimensionally adjust the angle of the unique automatic-water-shedding height-adjustable three-dimensionally-adjustable fence-post-base system;
   c) Can not allow each of automatic-water-shedding three-dimensionally-adjustable tapping-screw systems 101 to independently adjust at an independent angle as it penetrates inconsistent materials
       to allow the unique automatic-water-shedding height-adjustable three-dimensionally-adjustable fence-post-base system to remain perpendicular to the ground; and
   d) Can not provide a solid, adjustable, four-point, permanent connection to the patio, the pool floor, etc. (such as, concrete, wood, tile, or composite surface)
       to secure the unique automatic-water-shedding height-adjustable three-dimensionally-adjustable fence-post-base system thereto.

2) No prior art mention or disclose any fence-post base, having
   automatic-water-shedding three-dimensionally-adjustable tapping-screw water-sealing ridge 106 and
   automatic-water-shedding height-adjustable tube-screw water-sealing dike 114.
   Therefore, the prior art of fence-post base:
   a) Can not prevent pool water and rainwater from getting on automatic-water-shedding three-dimensionally-adjustable tapping-screw thread 108
       to prevent automatic-water-shedding three-dimensionally-adjustable tapping-screw thread 108 from corrosion;
   b) Can not prevent pool water and rainwater from getting into the drilled holes in the patio, the pool floor, etc. (such as, concrete, wood, tile, or composite surface)
       to prevent the patio, the pool floor, etc. from rotting away.

3) No prior art mention or disclose any fence-post base, having
   automatic-water-shedding height-adjustable tube-screw convex head bottom 113 and
   automatic-water-shedding height-adjustable three-dimensionally-adjustable concave base top 123.
   Therefore, the prior art of fence-post base:
   a) Can not allow automatic-water-shedding height-adjustable tube-screw systems 110 to rotate 360 degrees
       to adjust the elevation of the unique automatic-water-shedding height-adjustable three-dimensionally-adjustable fence-post-base system;
   b) Can not secure automatic-water-shedding height-adjustable tube-screw systems 110 inside automatic-water-shedding height-adjustable three-dimensionally-adjustable base system 122
       to three-dimensionally adjust the angle of the unique automatic-water-shedding height-adjustable three-dimensionally-adjustable fence-post-base system;
   c) Can not allow each of automatic-water-shedding three-dimensionally-adjustable tapping-screw systems 101 to independently adjust at an independent angle as it penetrates inconsistent materials
       to allow the unique automatic-water-shedding height-adjustable three-dimensionally-adjustable fence-post-base system to remain perpendicular to the ground; and
   d) Can not provide a solid, adjustable, four-point, permanent connection to the patio, the pool floor, etc. (such as, concrete, wood, tile, or composite surface)
       to secure the unique automatic-water-shedding height-adjustable three-dimensionally-adjustable fence-post-base system thereto.

4) No prior art mention or disclose any fence-post base, having
   automatic-water-shedding height-adjustable tube-screw rain-water reservoir 115.
   Therefore, the prior art of fence-post base:
   a) Can not store poll water and rainwater therein
       to prevent pool water and rainwater from getting into the drilled holes made by automatic-water-shedding three-dimensionally-adjustable tapping-screw drilling tip 109 in the patio, the pool floor, etc. (such as, concrete, wood, tile, or composite surface)
       to prevent the patio, the pool floor, etc. from rotting away; and
   b) Can not keep pool water and rainwater away from automatic-water-shedding three-dimensionally-adjustable tapping-screw systems 101 and automatic-water-shedding height-adjustable tube-screw systems 110
       to prevent accelerated corrosion to the components of the unique automatic-water-shedding height-adjustable three-dimensionally-adjustable fence-post-base system.

5) No prior art mention or disclose any fence-post base, having
   automatic-water-shedding height-adjustable tube-screw rain-water reservoir channels 116.
   Therefore, the prior art of fence-post base:
   a) Can not drain pool water and rainwater away from the components of the unique automatic-water-shedding height-adjustable three-dimensionally-adjustable fence-post-base system
       to prevent accelerated corrosion to the components of the unique automatic-water-shedding height-adjustable three-dimensionally-adjustable fence-post-base system;
   b) Can not allow pool water and rainwater to evaporate therethrough to prevent accelerated corrosion to the components of the unique automatic-water-shedding height-adjustable three-dimensionally-adjustable fence-post-base system; and c) Can not channel pool water and rainwater through and away from the components of the unique automatic-water-shedding height-adjustable three-dimensionally-adjustable fence-post-base system
to prevent the growth of mold, and mildew to eliminate an unhealthy environment.

6) No prior art mention or disclose any fence-post base, having
automatic-water-shedding height-adjustable tube-screw water-sealing ridge 117
and
automatic-water-shedding height-adjustable three-dimensionally-adjustable base dikes 127.
Therefore, the prior art of fence-post base:
a) Can not prevent pool water and rainwater from getting on automatic-water-shedding three-dimensionally-adjustable tapping-screw thread 108
to prevent automatic-water-shedding three-dimensionally-adjustable tapping-screw thread 108 from corrosion; and
b) Can not prevent pool water and rainwater from getting into the drilled holes ma by automatic-water-shedding three-dimensionally-adjustable tapping-screw drilling tip 109 in the patio, the pool floor, etc. (such as, concrete, wood, tile, or composite surface)
to prevent the patio, the pool floor, etc. from rotting away.

7) No prior art mention or disclose any fence-post base, having
automatic-water-shedding height-adjustable tube-screw locking teeth 121.
Therefore, the prior art of fence-post base:
a) Can not bite into the patio, the pool floor, etc. (such as, concrete, wood, tile, or composite surface)
to secure automatic-water-shedding three-dimensionally-adjustable tapping-screw systems 101, automatic-water-shedding height-adjustable tube-screw systems 110, and automatic-water-shedding height-adjustable three-dimensionally-adjustable base system 122 to the patio, the pool floor, etc.; and
b) Can not bite into the patio, the pool floor, etc. (such as, concrete, wood, tile, or composite surface)
to prevent automatic-water-shedding height-adjustable tube-screw systems 110 from unscrewing themselves.

8) No prior art mention or disclose any fence-post base, having
automatic-water-shedding height-adjustable three-dimensionally-adjustable base rain-water reservoirs 128 and
automatic-water-shedding height-adjustable three-dimensionally-adjustable base water-collecting sumps 129.
Therefore, the prior art of fence-post base:
a) Can not store poll water and rainwater therein
to prevent pool water and rainwater from getting into the drilled holes made by automatic-water-shedding three-dimensionally-adjustable tapping-screw drilling tip 109 in the patio, the pool floor, etc.
to prevent the patio, the pool floor, etc. (such as, concrete, wood, tile, or composite surface) from rotting away; and b) Can not keep pool water and rainwater away from automatic-water-shedding three-dimensionally-adjustable tapping-screw systems 101 and automatic-water-shedding height-adjustable tube-screw systems 110
to prevent accelerated corrosion to the components of the unique automatic-water-shedding height-adjustable three-dimensionally-adjustable fence-post-base system.

9) No prior art mention or disclose any fence-post base, having
automatic-water-shedding height-adjustable three-dimensionally-adjustable base sump ducts 130.
Therefore, the prior art of fence-post base:
a) Can not drain pool water and rainwater away from the components of the unique automatic-water-shedding height-adjustable three-dimensionally-adjustable fence-post-base system
to prevent accelerated corrosion to the components of the unique automatic-water-shedding height-adjustable three-dimensionally-adjustable fence-post-base system;
b) Can not allow pool water and rainwater to evaporate therethrough
to prevent accelerated corrosion to the components of the unique automatic-water-shedding height-adjustable three-dimensionally-adjustable fence-post-base system; and
c) Can not channel pool water and rainwater through and away from the components of the unique automatic-water-shedding height-adjustable three-dimensionally-adjustable fence-post-base system
to prevent the growth of mold, and mildew to eliminate an unhealthy environment.

10) No prior art mention or disclose any fence-post base, having
water-evaporation-inducing-and-water-draining-inducing pads 132*a*.
Therefore, the prior art of fence-post base:
a) Can not channel pool water and rainwater through and away from the components of the unique automatic-water-shedding height-adjustable three-dimensionally-adjustable fence-post-base system
to prevent the growth of mold, and mildew to eliminate an unhealthy environment;
b) Can not allow pool water and rainwater to evaporate therethrough
to prevent accelerated corrosion to the components of the unique automatic-water-shedding height-adjustable three-dimensionally-adjustable fence-post-base system; and
c) Can not allows air to freely circulate through the unique automatic-water-shedding height-adjustable three-dimensionally-adjustable fence-post-base system
to promote a quickly drying surface and space below the unique automatic-water-shedding height-adjustable three-dimensionally-adjustable fence-post-base system.

Objects and Advantages of the Invention

The new invention substantially departs from the conventional concepts and designs of the prior art. In doing so, the new invention provides a
unique automatic-water-shedding height-adjustable three-dimensionally-adjustable fence-post-base system having many unique and significant features, functions, and advantages, which overcome all the disadvantages of the prior art, as follows:

1) It is an object of the new invention to provide a unique automatic-water-shedding height-adjustable three-dimensionally-adjustable fence-post-base system,
having
automatic-water-shedding three-dimensionally-adjustable tapping-screw convex head bottom 104 and
automatic-water-shedding height-adjustable tube-screw concave head top 111.
Therefore, the unique automatic-water-shedding height-adjustable three-dimensionally-adjustable fence-post-base system:
   a) Can allow automatic-water-shedding three-dimensionally-adjustable tapping-screw systems 101 to rotate 360 degrees
      to adjust the elevation of the unique automatic-water-shedding height-adjustable three-dimensionally-adjustable fence-post-base system;
   b) Can allow automatic-water-shedding three-dimensionally-adjustable tapping-screw systems 101 to lean in any direction
      to three-dimensionally adjust the angle of the unique automatic-water-shedding height-adjustable three-dimensionally-adjustable fence-post-base system;
   c) Can allow each of automatic-water-shedding three-dimensionally-adjustable tapping-screw systems 101 to independently adjust at an independent angle as it penetrates inconsistent materials
      to allow the unique automatic-water-shedding height-adjustable three-dimensionally-adjustable fence-post-base system to remain perpendicular to the ground; and
   d) Can provide a solid, adjustable, four-point, permanent connection to the patio, the pool floor, etc. (such as, concrete, wood, tile, or composite surface)
      to secure the unique automatic-water-shedding height-adjustable three-dimensionally-adjustable fence-post-base system thereto.

2) It is another object of the new invention to provide a unique automatic-water-shedding height-adjustable three-dimensionally-adjustable fence-post-base system,
having
automatic-water-shedding three-dimensionally-adjustable tapping-screw water-sealing ridge 106 and
automatic-water-shedding height-adjustable tube-screw water-sealing dike 114.
Therefore, the unique automatic-water-shedding height-adjustable three-dimensionally-adjustable fence-post-base system:
   a) Can prevent pool water and rainwater from getting on automatic-water-shedding three-dimensionally-adjustable tapping-screw thread 108
      to prevent automatic-water-shedding three-dimensionally-adjustable tapping-screw thread 108 from corrosion;
   b) Can prevent pool water and rainwater from getting into the drilled holes in the patio, the pool floor, etc. (such as, concrete, wood, tile, or composite surface)
      to prevent the patio, the pool floor, etc. from rotting away.

3) It is a further object of the new invention to provide a unique automatic-water-shedding height-adjustable three-dimensionally-adjustable fence-post-base system,
having
automatic-water-shedding height-adjustable tube-screw convex head bottom 113
and
automatic-water-shedding height-adjustable three-dimensionally-adjustable concave base top 123.
Therefore, the unique automatic-water-shedding height-adjustable three-dimensionally-adjustable fence-post-base system:
   a) Can allow automatic-water-shedding height-adjustable tube-screw systems 110 to rotate 360 degrees
      to adjust the elevation of the unique automatic-water-shedding height-adjustable three-dimensionally-adjustable fence-post-base system;
   b) Can secure automatic-water-shedding height-adjustable tube-screw systems 110 inside automatic-water-shedding height-adjustable three-dimensionally-adjustable base system 122
      to three-dimensionally adjust the angle of the unique automatic-water-shedding height-adjustable three-dimensionally-adjustable fence-post-base system;
   c) Can allow each of automatic-water-shedding three-dimensionally-adjustable tapping-screw systems 101 to independently adjust at an independent angle as it penetrates inconsistent materials
      to allow the unique automatic-water-shedding height-adjustable three-dimensionally-adjustable fence-post-base system to remain perpendicular to the ground; and
   d) Can provide a solid, adjustable, four-point, permanent connection to the patio, the pool floor, etc. (such as, concrete, wood, tile, or composite surface)
      to secure the unique automatic-water-shedding height-adjustable three-dimensionally-adjustable fence-post-base system thereto.

4) It is an even further object of the new invention to provide a unique automatic-water-shedding height-adjustable three-dimensionally-adjustable fence-post-base system,
having
automatic-water-shedding height-adjustable tube-screw rain-water reservoir 115.
Therefore, the unique automatic-water-shedding height-adjustable three-dimensionally-adjustable fence-post-base system:
   a) Can store poll water and rainwater therein
      to prevent pool water and rainwater from getting into the drilled holes made by automatic-water-shedding three-dimensionally-adjustable tapping-screw drilling tip 109 in the patio, the pool floor, etc. (such as, concrete, wood, tile, or composite surface)
      to prevent the patio, the pool floor, etc. from rotting away; and
   b) Can keep pool water and rainwater away from automatic-water-shedding three-dimensionally-adjustable tapping-screw systems 101 and automatic-water-shedding height-adjustable tube-screw systems 110
      to prevent accelerated corrosion to the components of the unique automatic-water-shedding height-adjustable three-dimensionally-adjustable fence-post-base system.

5) It is another object of the new invention to provide a unique automatic-water-shedding height-adjustable three-dimensionally-adjustable fence-post-base system,
having
automatic-water-shedding height-adjustable tube-screw rain-water reservoir channels 116.

Therefore, the unique automatic-water-shedding height-adjustable three-dimensionally-adjustable fence-post-base system:
 a) Can drain pool water and rainwater away from the components of the unique automatic-water-shedding height-adjustable three-dimensionally-adjustable fence-post-base system
  to prevent accelerated corrosion to the components of the unique automatic-water-shedding height-adjustable three-dimensionally-adjustable fence-post-base system;
 b) Can allow pool water and rainwater to evaporate therethrough
  to prevent accelerated corrosion to the components of the unique automatic-water-shedding height-adjustable three-dimensionally-adjustable fence-post-base system; and
 c) Can channel pool water and rainwater through and away from the components of the unique automatic-water-shedding height-adjustable three-dimensionally-adjustable fence-post-base system
  to prevent the growth of mold, and mildew to eliminate an unhealthy environment.

6) It is yet another object of the new invention to provide a unique automatic-water-shedding height-adjustable three-dimensionally-adjustable fence-post-base system,
having
automatic-water-shedding height-adjustable tube-screw water-sealing ridge 117
and
automatic-water-shedding height-adjustable three-dimensionally-adjustable base dikes 127.

Therefore, the unique automatic-water-shedding height-adjustable three-dimensionally-adjustable fence-post-base system:
 a) Can prevent pool water and rainwater from getting on automatic-water-shedding three-dimensionally-adjustable tapping-screw thread 108
  to prevent automatic-water-shedding three-dimensionally-adjustable tapping-screw thread 108 from corrosion; and
 b) Can prevent pool water and rainwater from getting into the drilled holes ma by automatic-water-shedding three-dimensionally-adjustable tapping-screw drilling tip 109 in the patio, the pool floor, etc. (such as, concrete, wood, tile, or composite surface)
  to prevent the patio, the pool floor, etc. from rotting away.

7) It is still yet another object of the new invention to provide a unique automatic-water-shedding height-adjustable three-dimensionally-adjustable fence-post-base system,
having
automatic-water-shedding height-adjustable tube-screw locking teeth 121.

Therefore, the unique automatic-water-shedding height-adjustable three-dimensionally-adjustable fence-post-base system:
 a) Can bite into the patio, the pool floor, etc. (such as, concrete, wood, tile, or composite surface)
  to secure automatic-water-shedding three-dimensionally-adjustable tapping-screw systems 101, automatic-water-shedding height-adjustable tube-screw systems 110, and automatic-water-shedding height-adjustable three-dimensionally-adjustable base system 122 to the patio, the pool floor, etc.; and
 b) Can bite into the patio, the pool floor, etc. (such as, concrete, wood, tile, or composite surface)
  to prevent automatic-water-shedding height-adjustable tube-screw systems 110 from unscrewing themselves.

8) It is still yet an even further object of the new invention to provide a unique automatic-water-shedding height-adjustable three-dimensionally-adjustable fence-post-base system,
having
automatic-water-shedding height-adjustable three-dimensionally-adjustable base rain-water reservoirs 128 and
automatic-water-shedding height-adjustable three-dimensionally-adjustable base water-collecting sumps 129.

Therefore, the unique automatic-water-shedding height-adjustable three-dimensionally-adjustable fence-post-base system:
 a) Can store poll water and rainwater therein
  to prevent pool water and rainwater from getting into the drilled holes made by automatic-water-shedding three-dimensionally-adjustable tapping-screw drilling tip 109 in the patio, the pool floor, etc.
  to prevent the patio, the pool floor, etc. (such as, concrete, wood, tile, or composite surface) from rotting away; and
 b) Can keep pool water and rainwater away from automatic-water-shedding three-dimensionally-adjustable tapping-screw systems 101 and automatic-water-shedding height-adjustable tube-screw systems 110
  to prevent accelerated corrosion to the components of the unique automatic-water-shedding height-adjustable three-dimensionally-adjustable fence-post-base system.

9) It is still yet an even further object of the new invention to provide a unique automatic-water-shedding height-adjustable three-dimensionally-adjustable fence-post-base system,
having
automatic-water-shedding height-adjustable three-dimensionally-adjustable base sump ducts 130.

Therefore, the unique automatic-water-shedding height-adjustable three-dimensionally-adjustable fence-post-base system:
 a) Can drain pool water and rainwater away from the components of the unique automatic-water-shedding height-adjustable three-dimensionally-adjustable fence-post-base system
  to prevent accelerated corrosion to the components of the unique automatic-water-shedding height-adjustable three-dimensionally-adjustable fence-post-base system;
 b) Can allow pool water and rainwater to evaporate therethrough
  to prevent accelerated corrosion to the components of the unique automatic-water-shedding height-adjustable three-dimensionally-adjustable fence-post-base system; and
 c) Can channel pool water and rainwater through and away from the components of the unique automaticwater-shedding height-adjustable three-dimensionally-adjustable fence-post-base system
to prevent the growth of mold, and mildew to eliminate an unhealthy environment.
10) It is still yet an even further object of the new invention to provide a unique automatic-water-shedding height-adjustable three-dimensionally-adjustable fence-post-base system,
having
water-evaporation-inducing-and-water-draining-inducing pads 132*a*.
Therefore, the unique automatic-water-shedding height-adjustable three-dimensionally-adjustable fence-post-base system:
  a) Can channel pool water and rainwater through and away from the components of the unique automatic-water-shedding height-adjustable three-dimensionally-adjustable fence-post-base system
    to prevent the growth of mold, and mildew to eliminate an unhealthy environment;
  b) Can allow pool water and rainwater to evaporate therethrough
    to prevent accelerated corrosion to the components of the unique automatic-water-shedding height-adjustable three-dimensionally-adjustable fence-post-base system; and
  c) Can allows air to freely circulate through the unique automatic-water-shedding height-adjustable three-dimensionally-adjustable fence-post-base system
    to promote a quickly drying surface and space below the unique automatic-water-shedding height-adjustable three-dimensionally-adjustable fence-post-base system.

Other objects and advantages of the present invention will become apparent from a consideration of the accompanying drawings and ensuing description.

SUMMARY OF THE INVENTION

Figure 1:
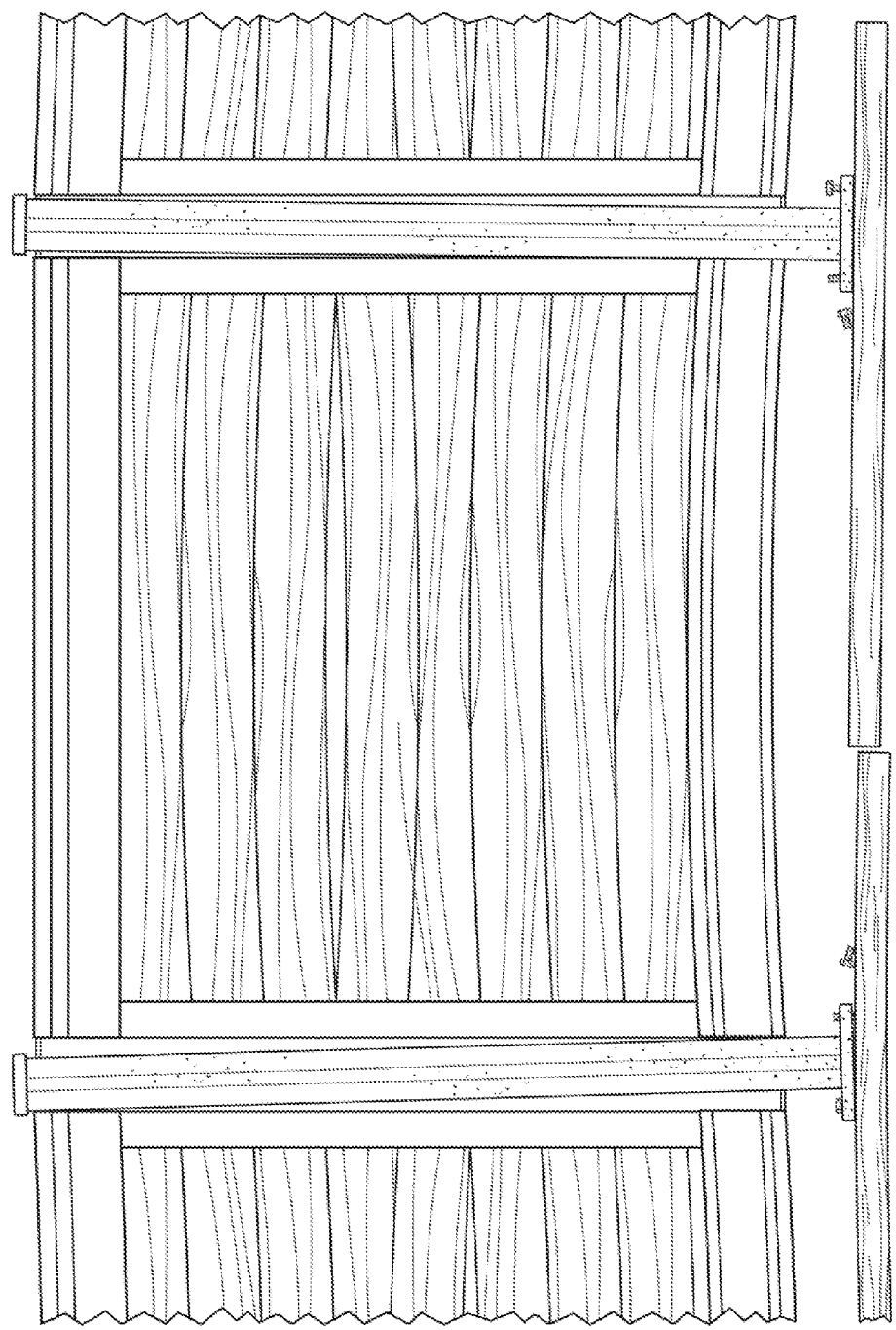
FIGS. 1 (PRIOR ART) and 2 (PRIOR ART) illustrate the disadvantages of the prior art.
Figure 2:
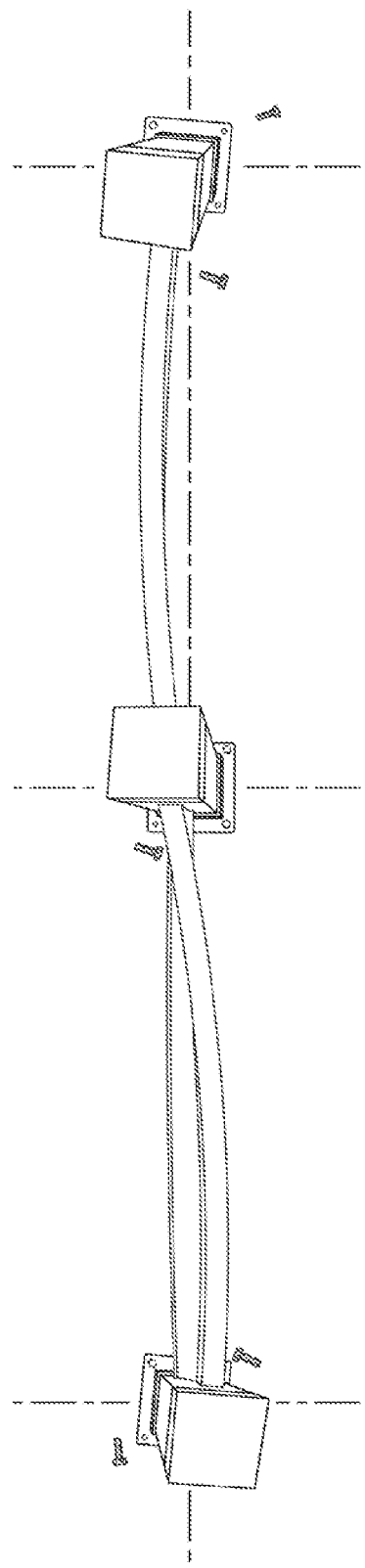
Figure 3:
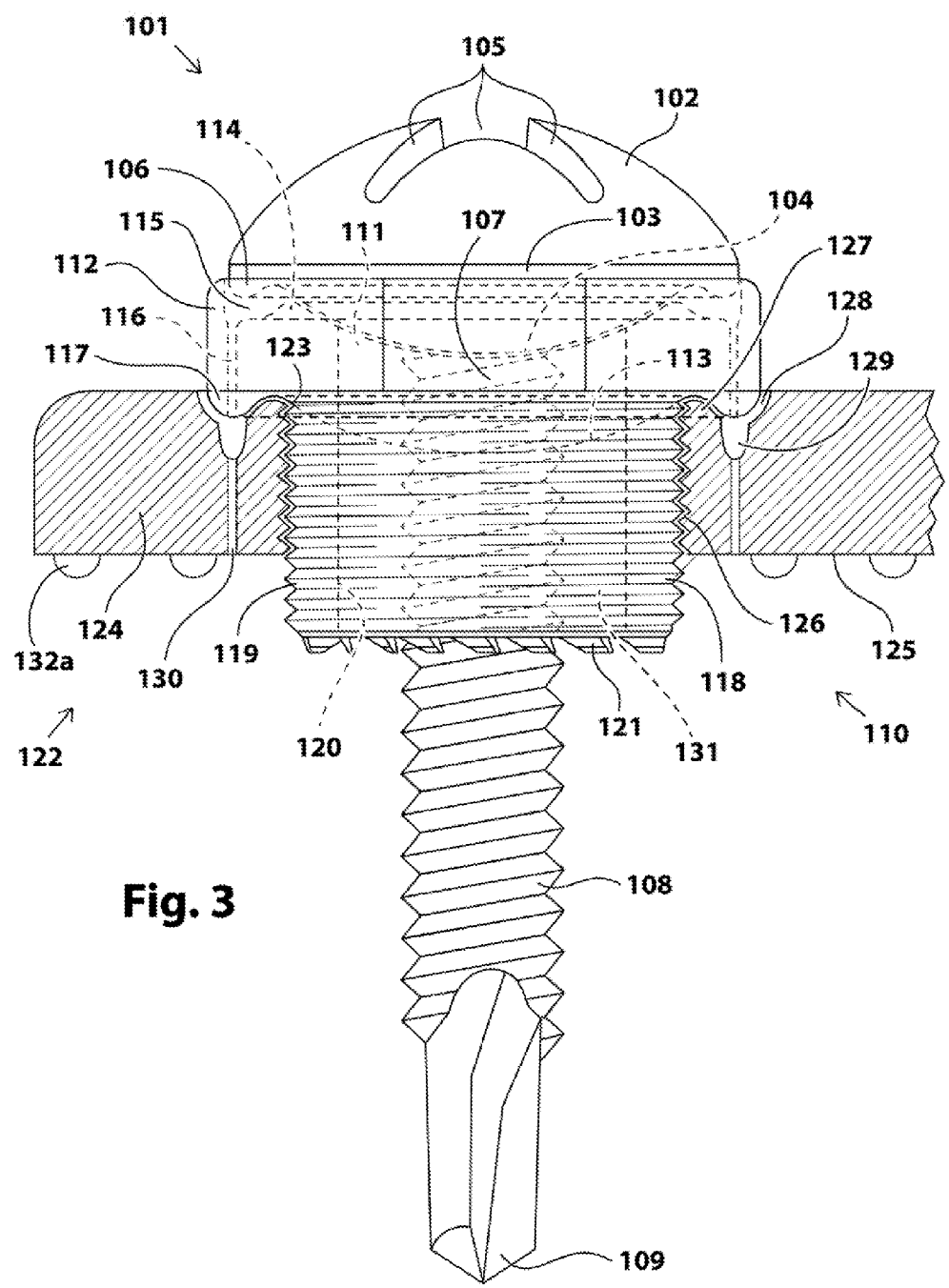
FIG. 3 illustrates a cross-sectional view of a unique automatic-water-shedding height-adjustable three-dimensionally-adjustable fence-post-base system, having ridges, dikes, reservoirs, channels, teeth, sumps, and ducts to shed and drain rain water away from it, and to allow rain water to evaporate away from under it.
Figure 4:
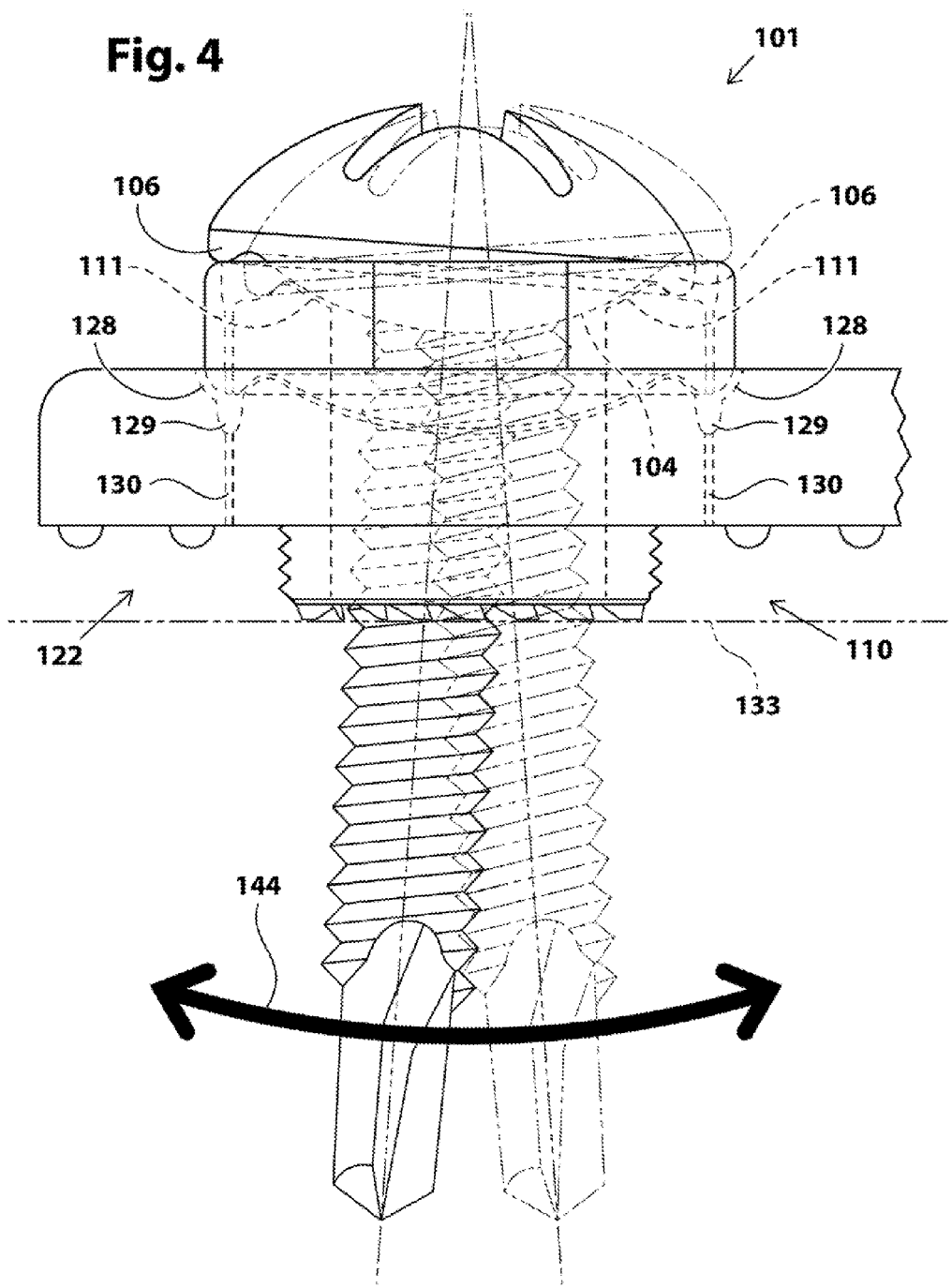
FIG. 4 illustrates a front view of how to three-dimensionally adjust automatic-water-shedding three-dimensionally-adjustable tapping-screw systems and an automatic-water-shedding height-adjustable three-dimensionally-adjustable base system.
Figure 5:
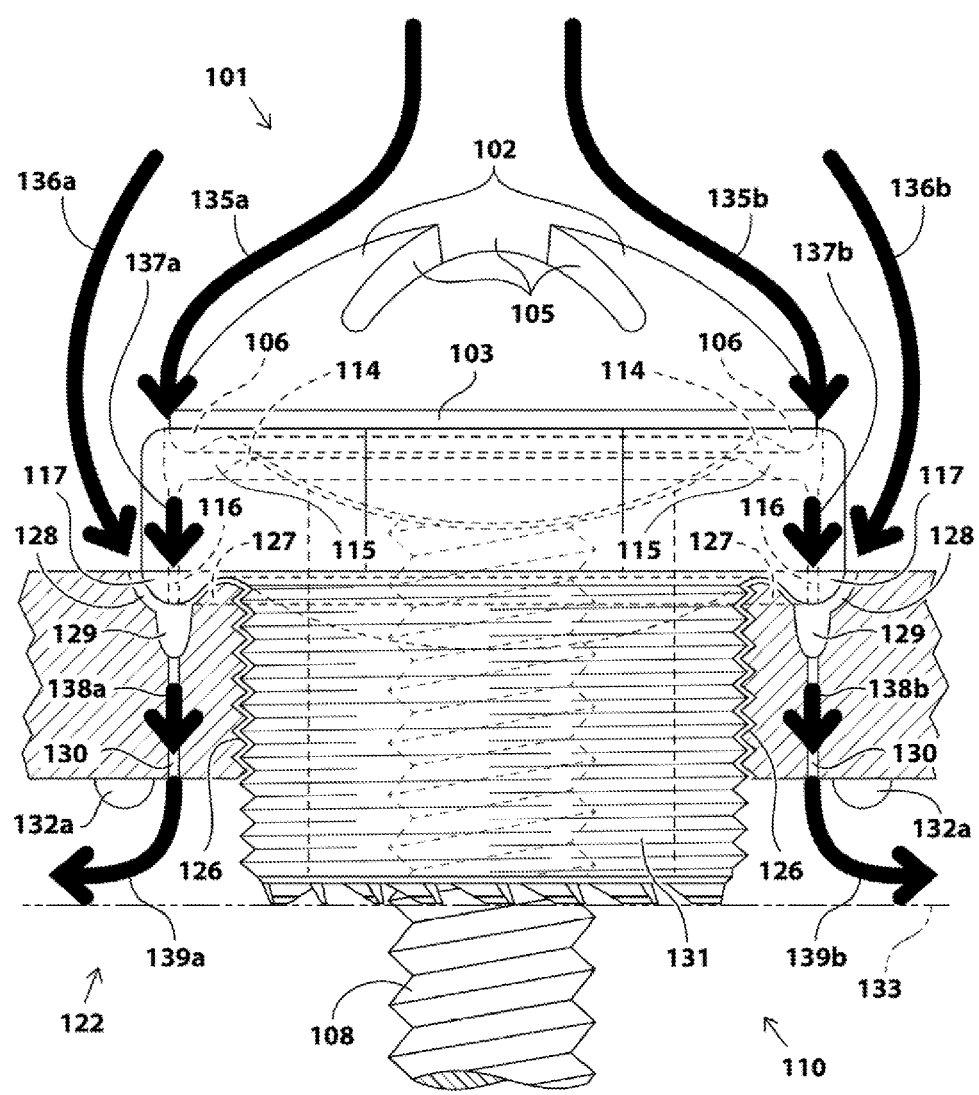
FIGS. 5 and 6 illustrate cross-sectional views of automatic-water-shedding three-dimensionally-adjustable tapping-screw systems, automatic-water-shedding height-adjustable tube-screw systems, and an automatic-water-shedding height-adjustable three-dimensionally-adjustable base system.
Figure 6:
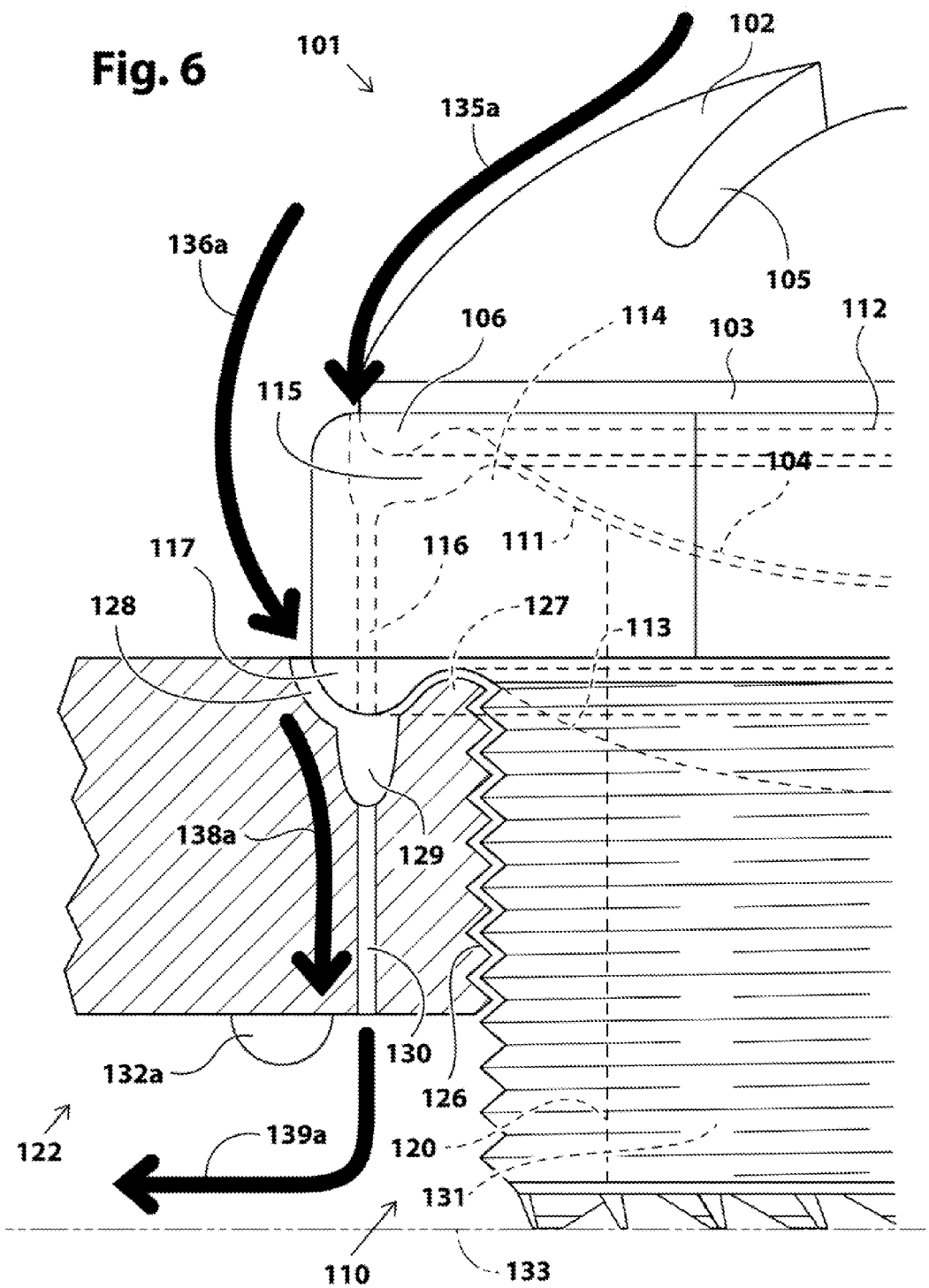
Figure 7:
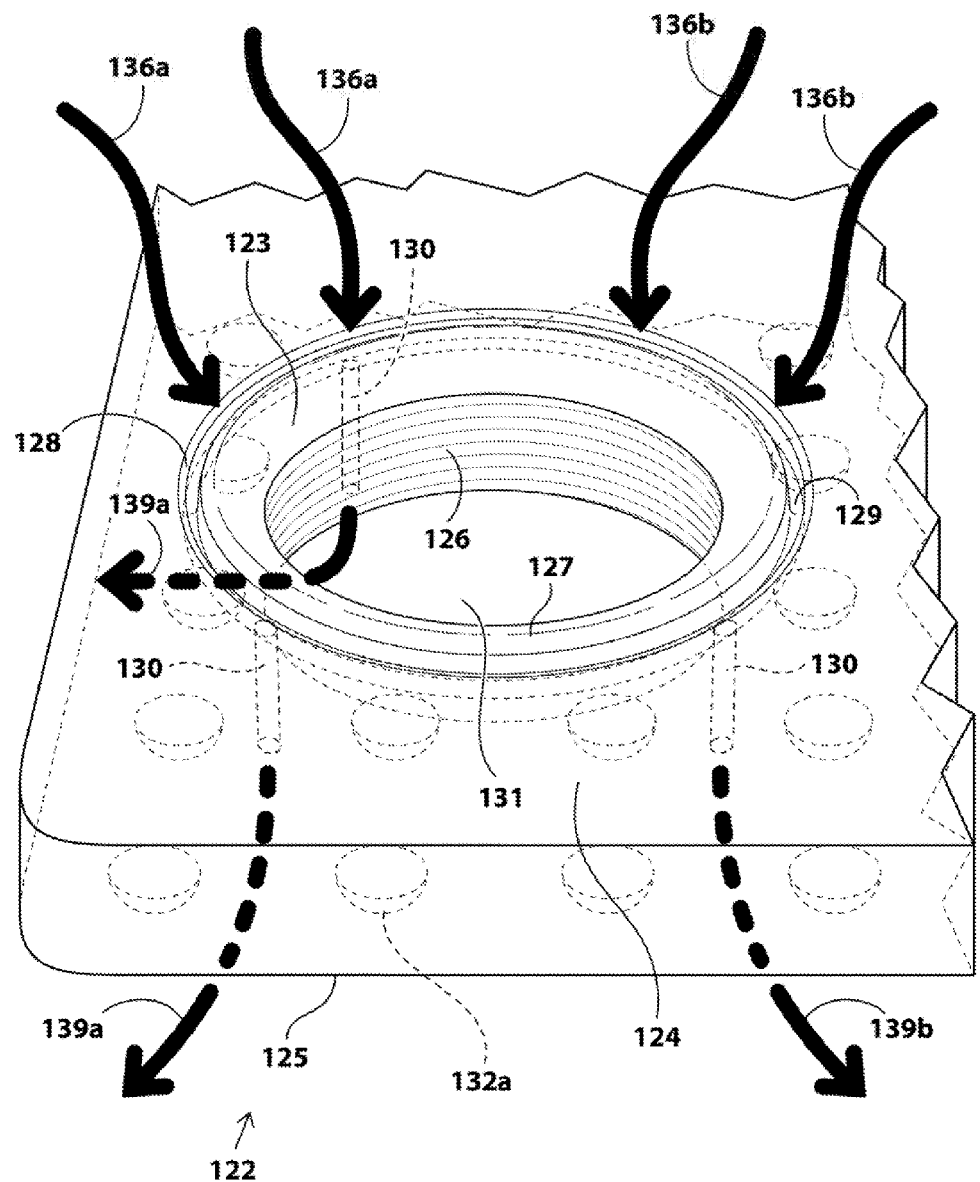
FIG. 7 illustrates a perspective view of the automatic-water-shedding height-adjustable three-dimensionally-adjustable base system.
Figure 8:
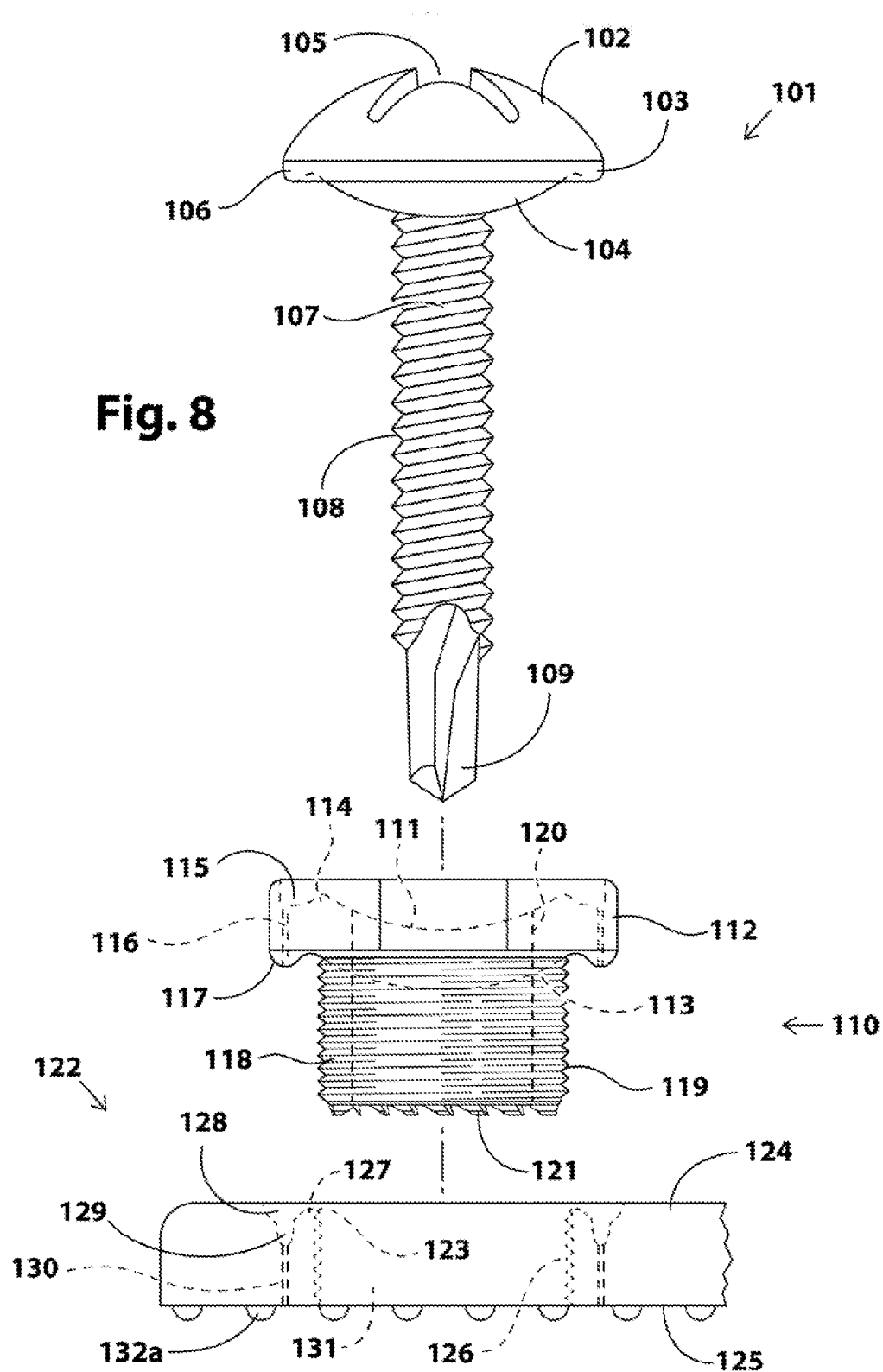
FIGS. 8 and 9 illustrate front views of the unique automatic-water-shedding height-adjustable three-dimensionally-adjustable fence-post-base system.
Figure 9:
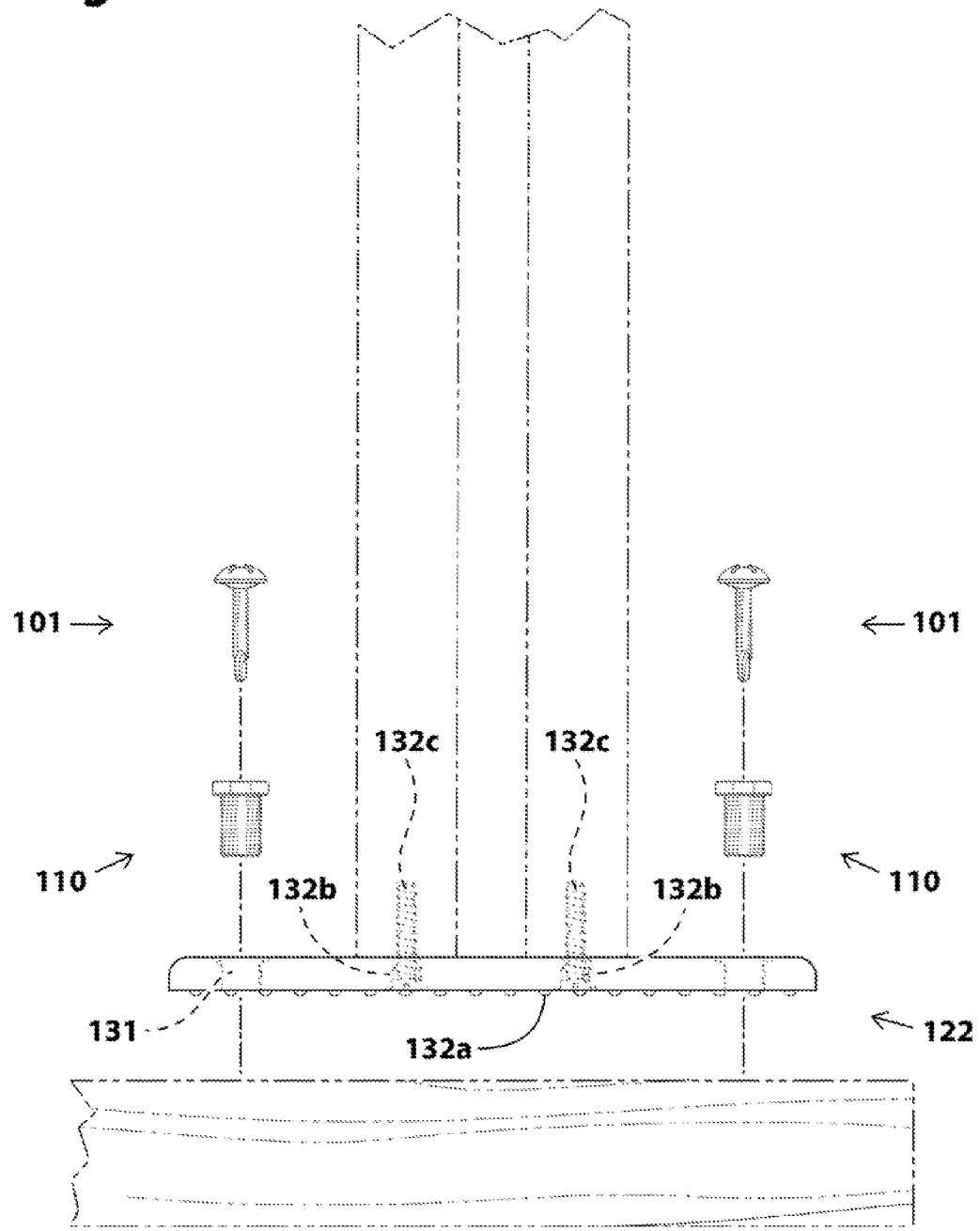
Figure 10:
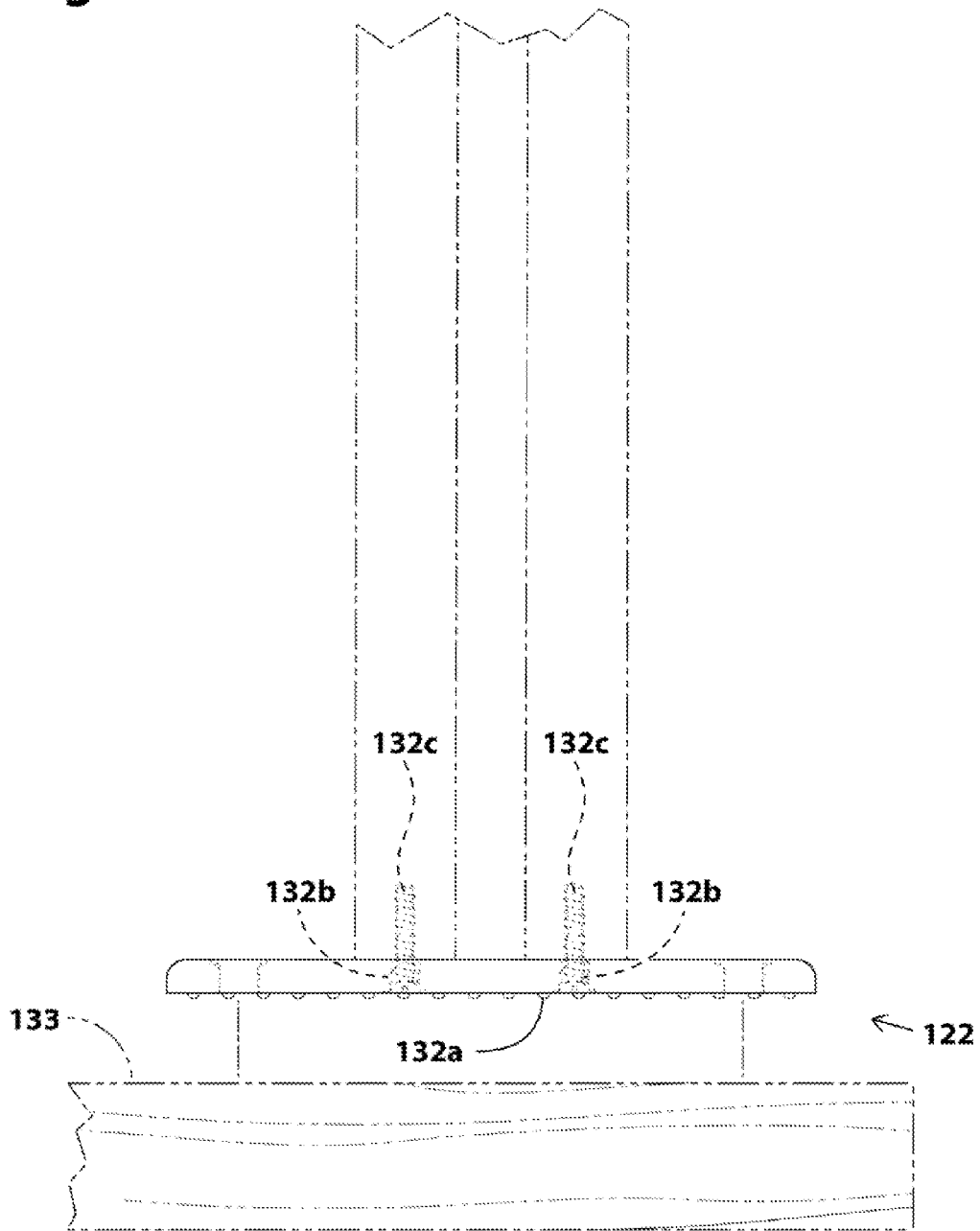
FIGS. 10, 11, 12, 13, 14, and 15 illustrate front views of how to assemble and adjust the height of the unique automatic-water-shedding height-adjustable three-dimensionally-adjustable fence-post-base system.
Figure 11:
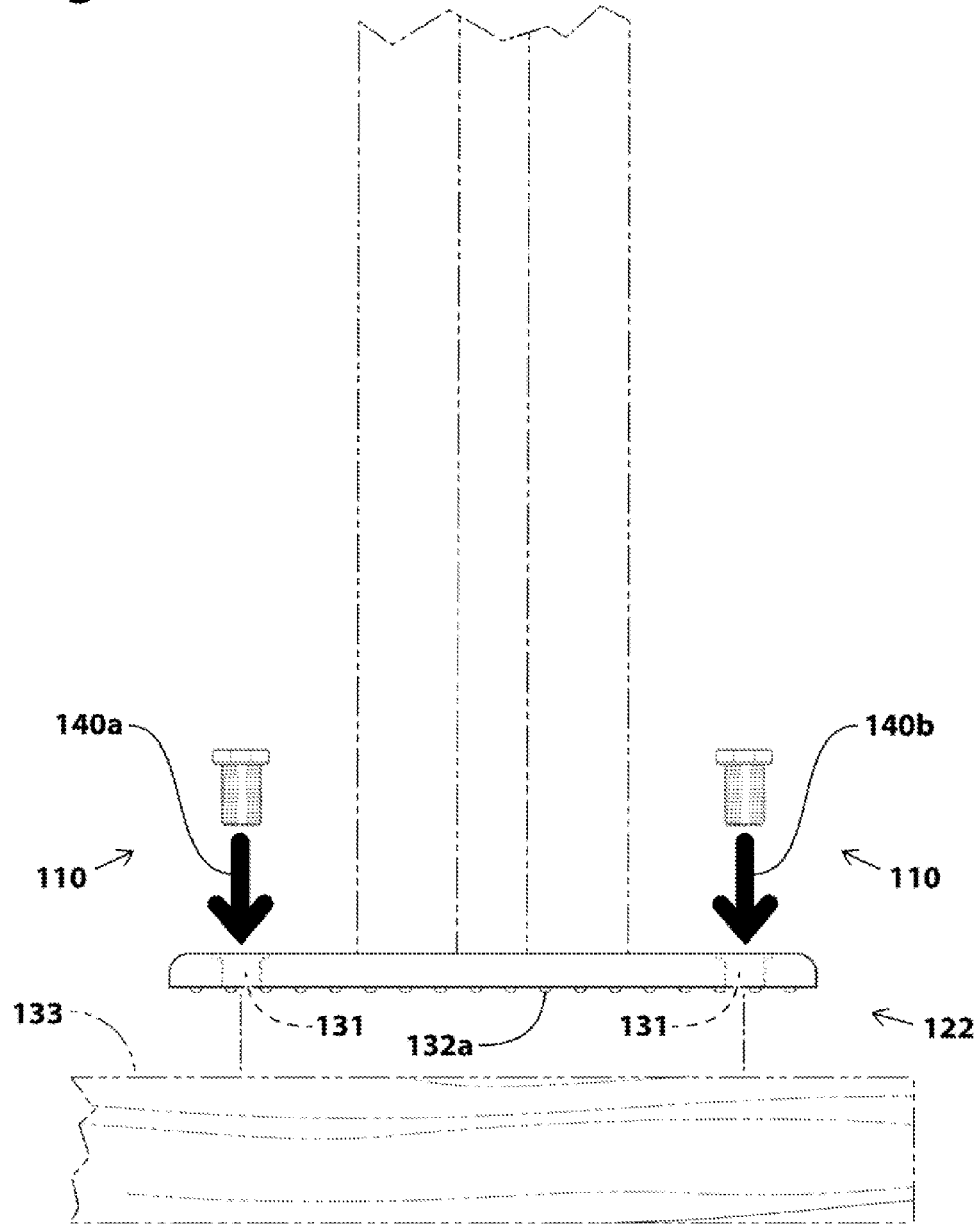
Figure 12:
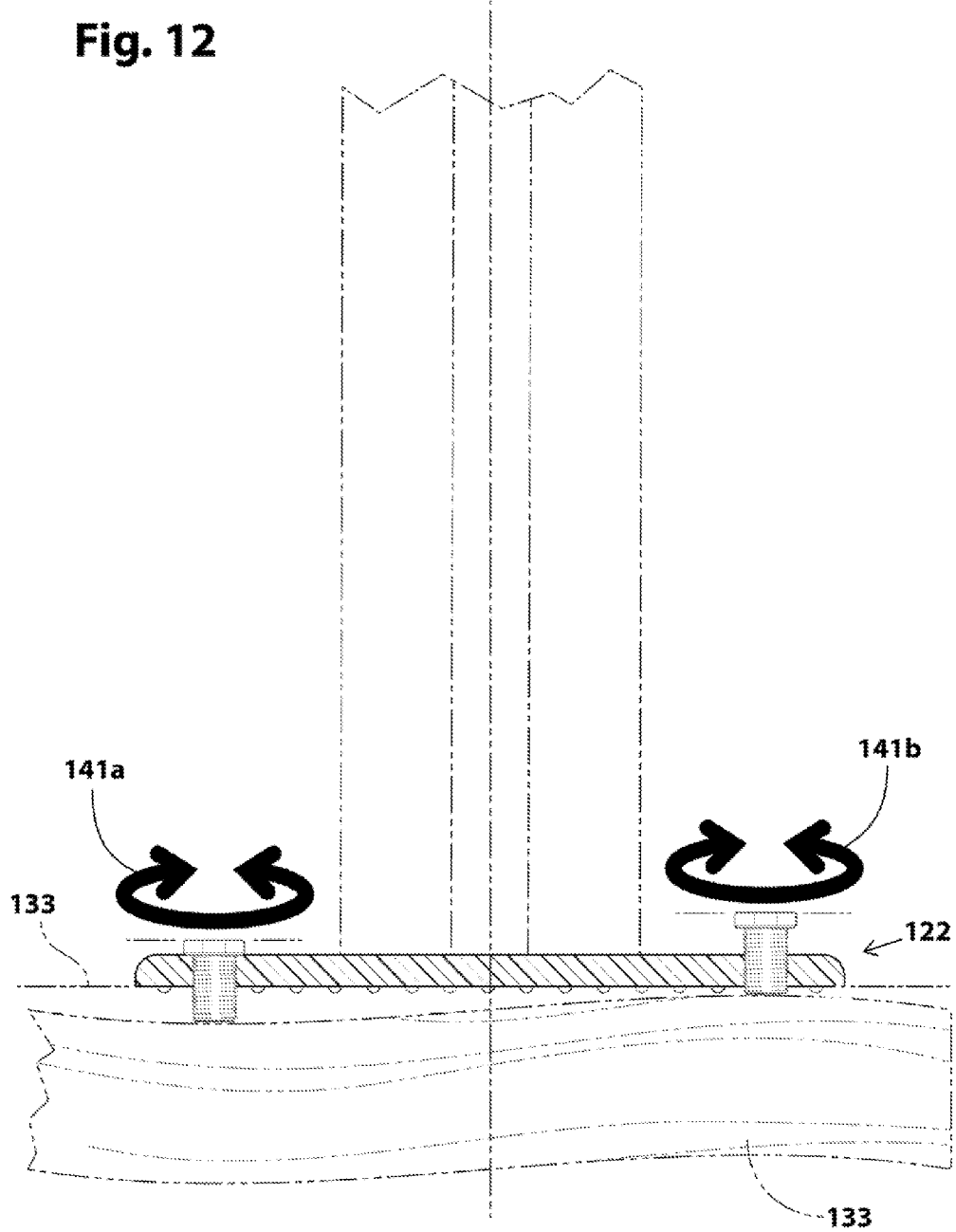
Figure 13:
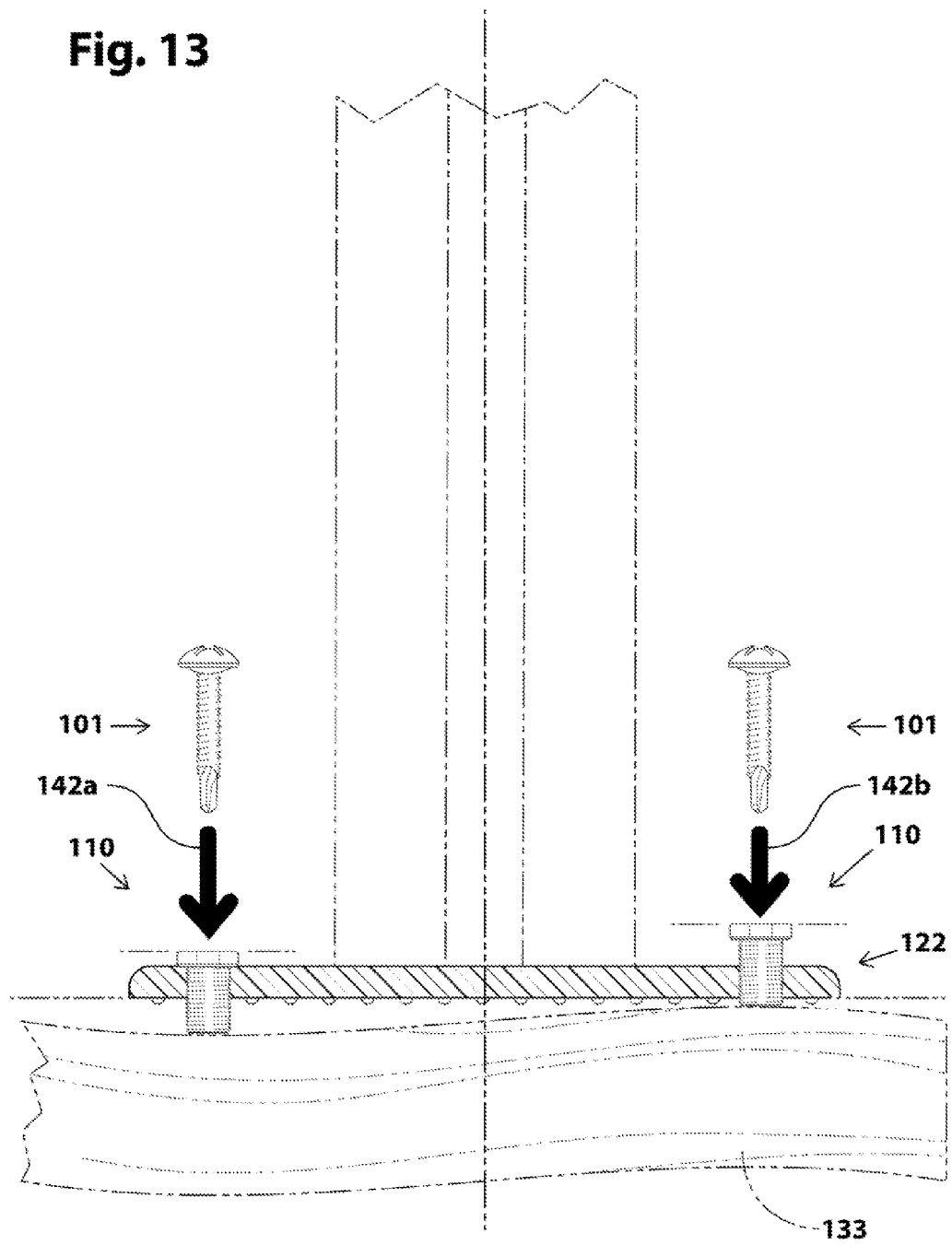
Figure 14:
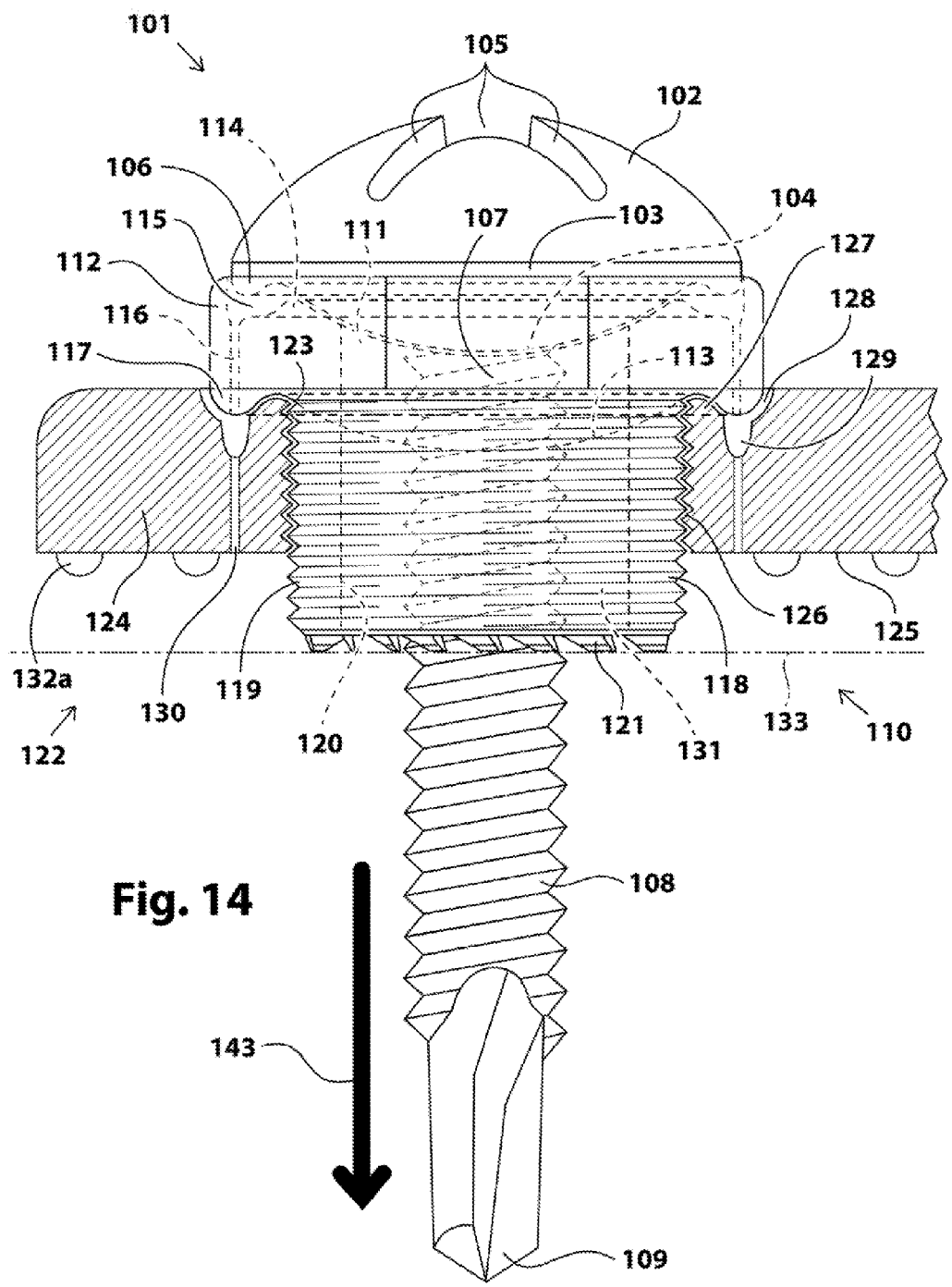
Figure 15:
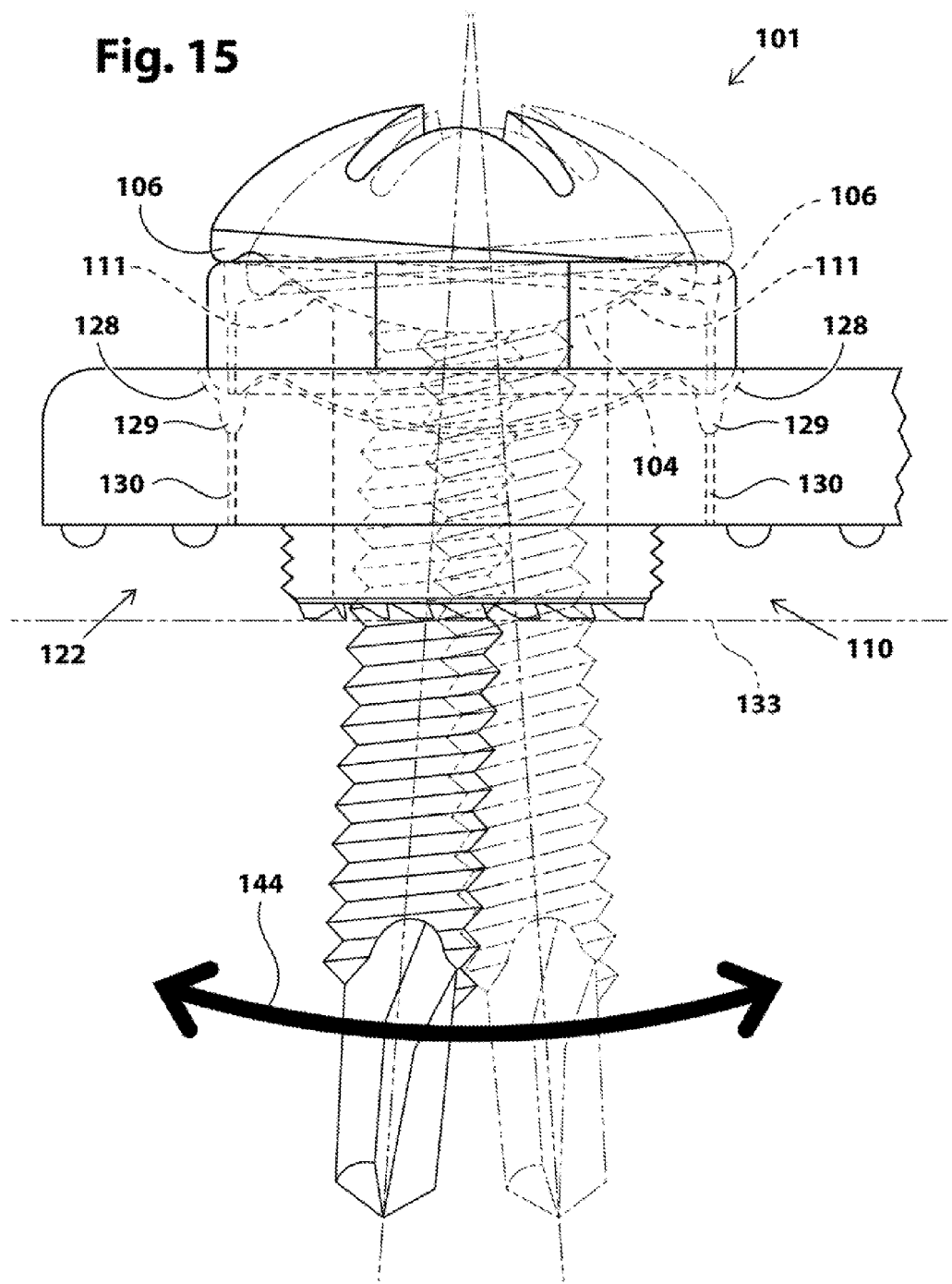
Figure 16:
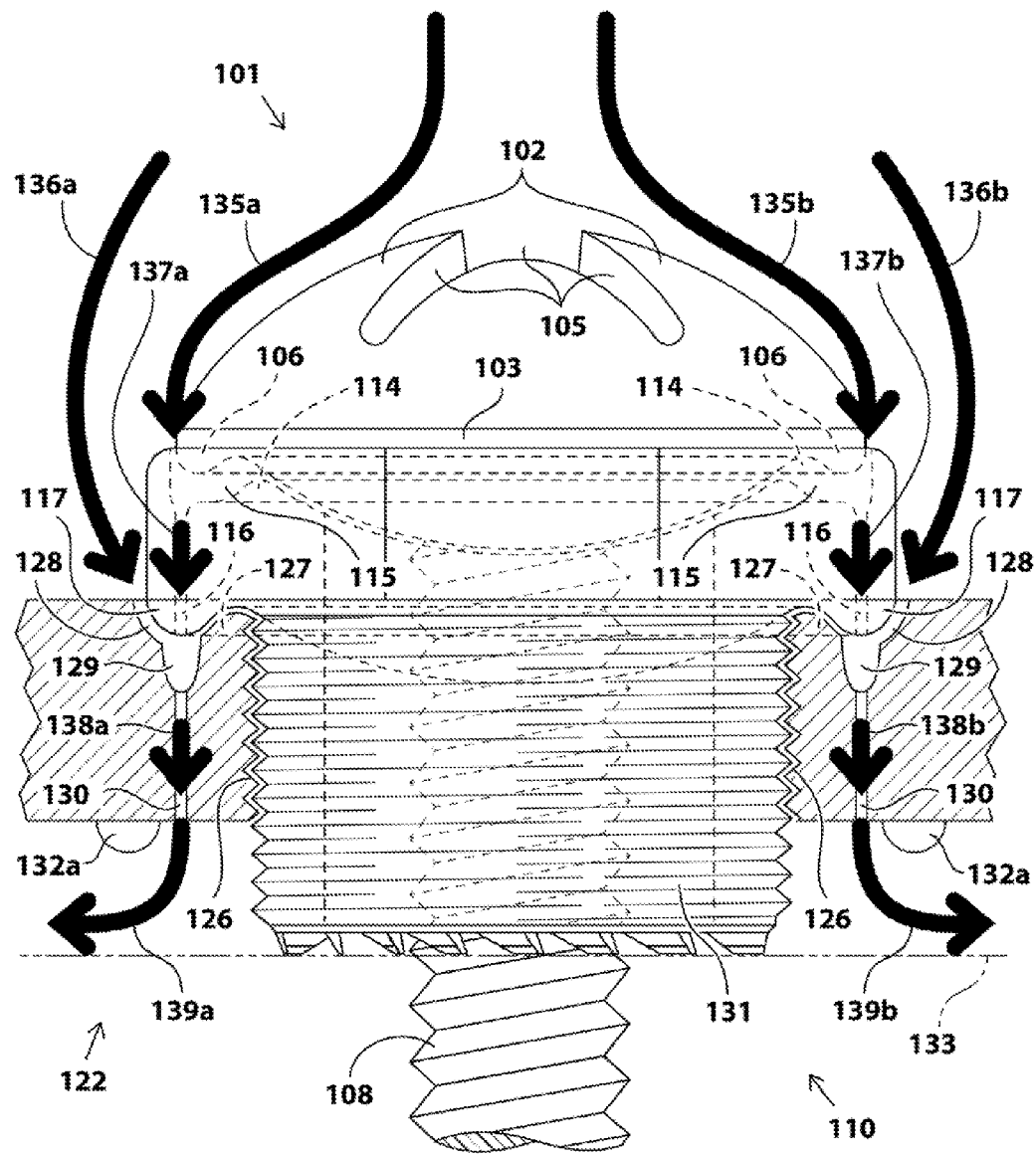
FIGS. 16, 17, 18, and 19 illustrate front and perspective views of how the unique automatic-water-shedding height-adjustable three-dimensionally-adjustable fence-post-base system sheds and drains rain water away from it, and how it allows rain water to evaporate away from under it.
Figure 17:
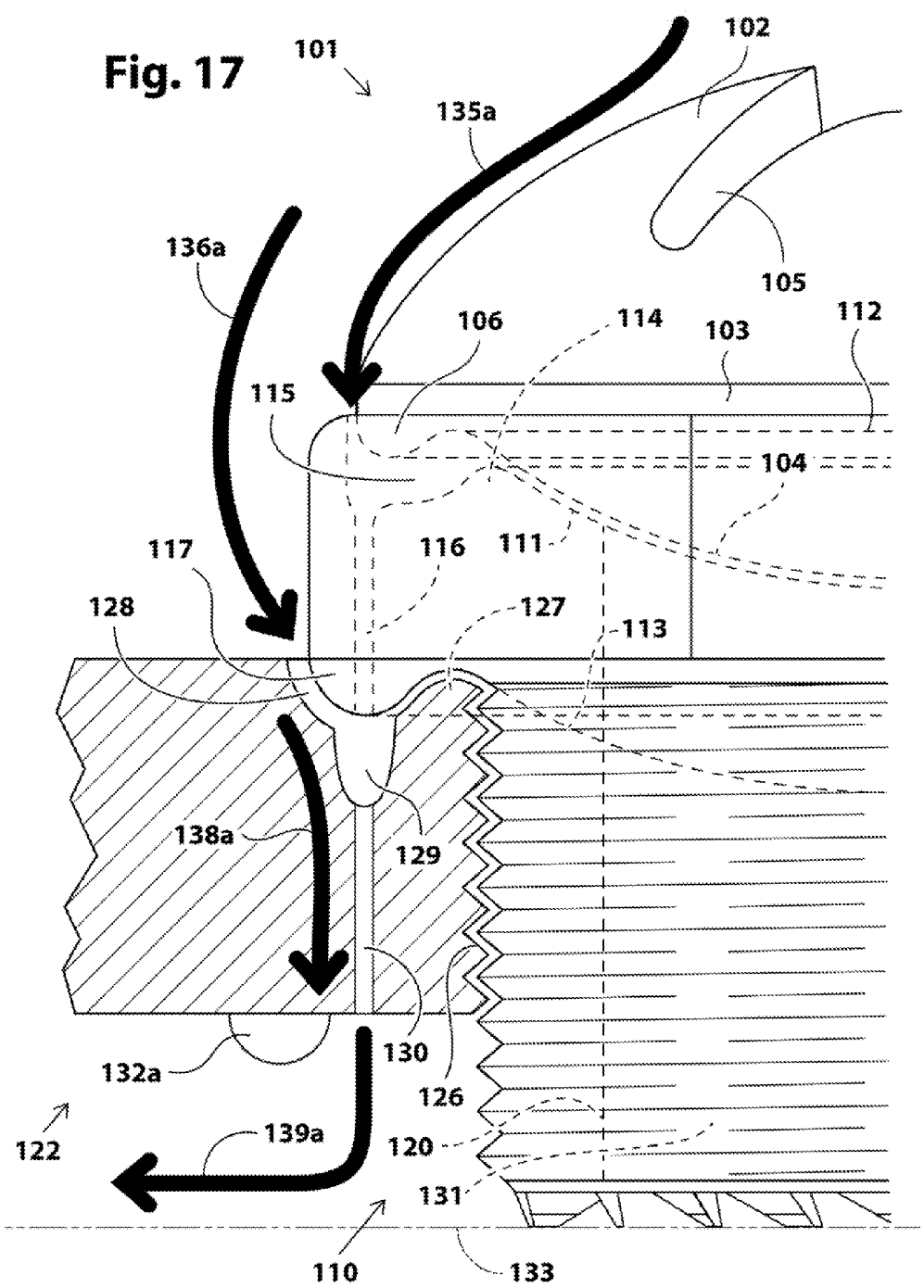
Figure 18:
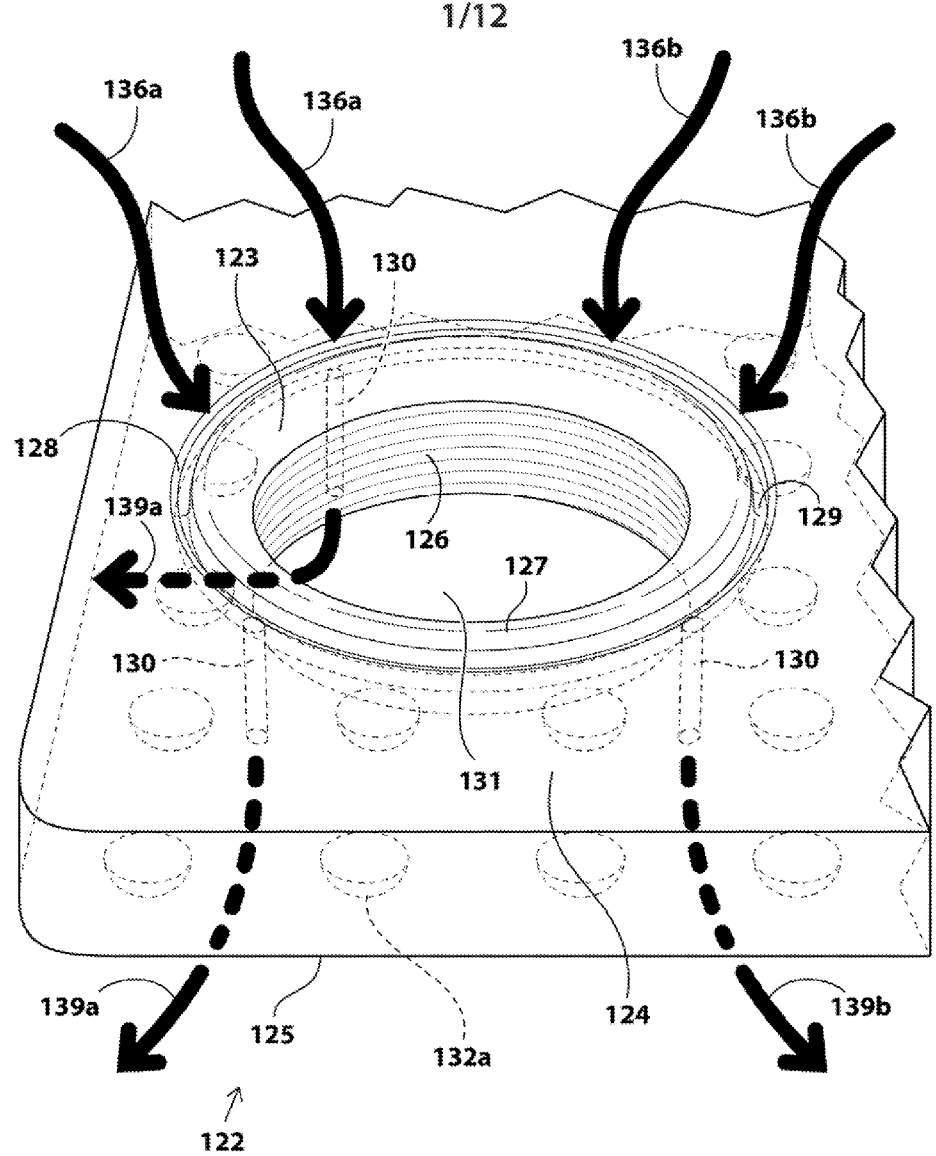
Figure 19:
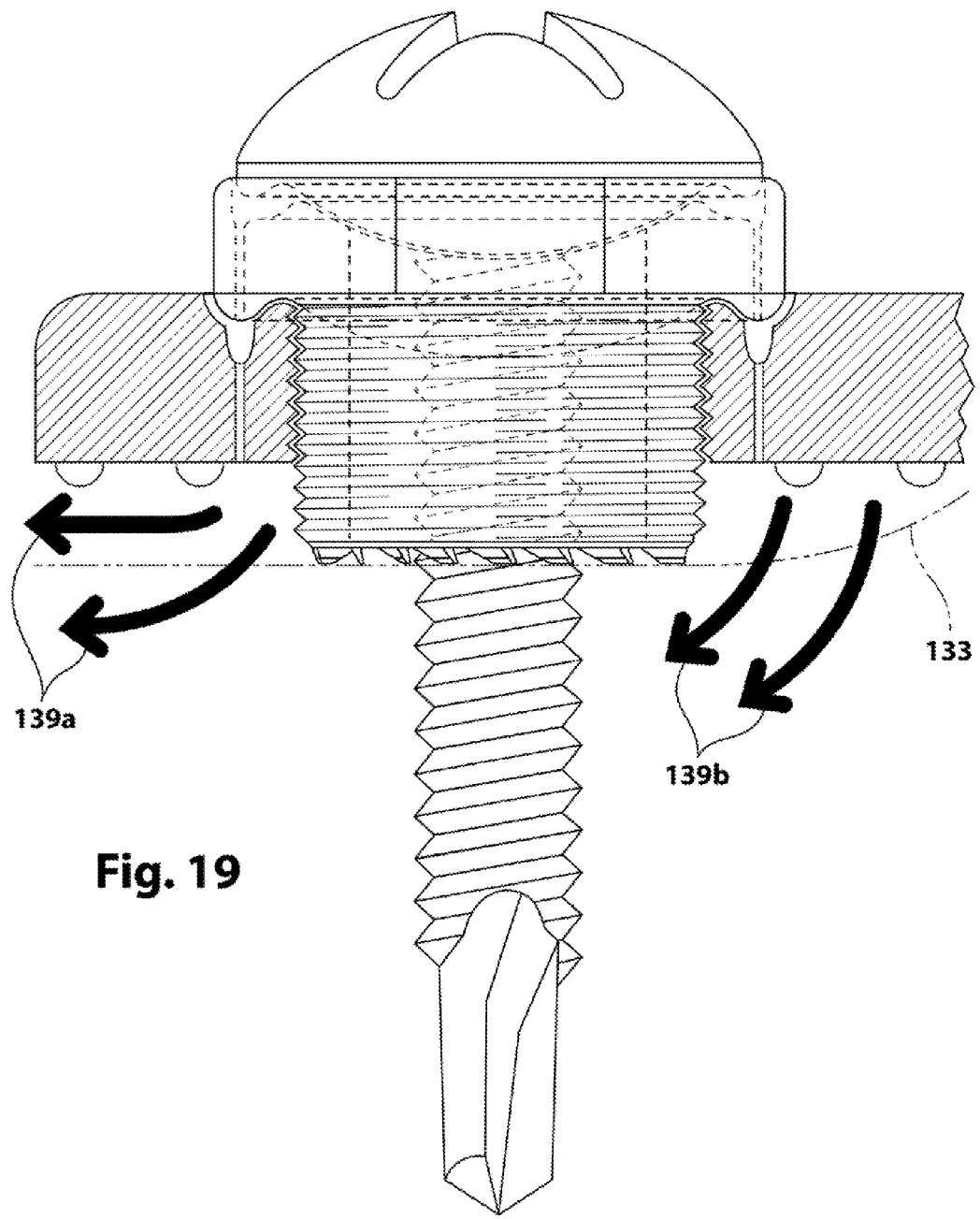

A unique automatic-water-shedding height-adjustable three-dimensionally-adjustable fence-post-base system comprises multiple automatic-water-shedding three-dimensionally-adjustable tapping-screw systems, multiple automatic-water-shedding height-adjustable tube-screw systems, and an automatic-water-shedding height-adjustable three-dimensionally-adjustable base system.
Each of multiple tapping-screw systems
has a convex head bottom for three-dimensionally adjusting themselves to three-dimensionally adjust the fence-post-base system when screwed into a foundation, and
has a circular water-sealing ridge for automatically preventing rain water from flowing into the underside of a foundation to prevent corrosion and the growth of mold.
Each of multiple tube-screw systems
has a concave head top for three-dimensionally adjusting the height of the fence-post-base system,
has a circular water-sealing dike for automatically preventing rain water from flowing into the underside of a foundation to prevent corrosion, and
has a circular rain-water reservoir and channels for automatically draining rain water away from themselves to prevent corrosion and the growth of mold.
Automatic-water-shedding three-dimensionally-adjustable base system has multiple rain-water reservoirs and ducts for automatically draining rain water away from themselves to prevent corrosion and the growth of mold, and has multiple water-evaporation-inducing-and-water-draining-inducing pads for lifting the fence-post-base system, for allowing air to freely circulate therethrough, and for automatically allowing rain water to drain and evaporate away from the fence-post-base system.

DETAILED DESCRIPTION OF THE INVENTION

Component

A unique automatic-water-shedding height-adjustable three-dimensionally-adjustable fence-post-base system has:
  a) Water-sealing ridges and dikes,
  b) Water-draining reservoirs and sumps,
  c) Water-draining channels and ducts,
  d) Fence-post-base-lifting pads,
  e) Base-height-adjusting tube screws, and
  f) Tube-screw-locking teeth
to shed and drain rainwater away from the unique automatic-water-shedding height-adjustable three-dimensionally-adjustable fence-post-base system,
to allow rainwater to evaporate away from under unique automatic-water-shedding height-adjustable three-dimensionally-adjustable fence-post-base system, and to lock unique automatic-water-shedding height-adjustable three-dimensionally-adjustable fence-post-base system to a foundation.

Referring to FIGS. 3, 4, 5, 6, 7, 8, and 9, a unique automatic-water-shedding height-adjustable three-dimensionally-adjustable fence-post-base system, having water-sealing ridges and dikes, water-draining reservoirs and sumps, water-draining channels and ducts, fence-post-base-lifting pads, base-height-adjusting tube screws, and tube-screw-locking teeth (to shed and drain rainwater away from the unique fence-post-base system, to allow rain water to evaporate away from under the unique fence-post-base system, and to lock the unique fence-post-base system to a foundation), comprises:

1) Automatic-water-shedding three-dimensionally-adjustable tapping-screw systems 101, each comprising:
2) Automatic-water-shedding three-dimensionally-adjustable tapping-screw convex head top 102,
3) Automatic-water-shedding three-dimensionally-adjustable tapping-screw head body 103,
4) Automatic-water-shedding three-dimensionally-adjustable tapping-screw convex head bottom 104,
5) Automatic-water-shedding three-dimensionally-adjustable tapping-screw driver slot 105,
6) Automatic-water-shedding three-dimensionally-adjustable tapping-screw water-sealing ridge 106,
7) Automatic-water-shedding three-dimensionally-adjustable tapping-screw shank 107,
8) Automatic-water-shedding three-dimensionally-adjustable tapping-screw thread 108, and
9) Automatic-water-shedding three-dimensionally-adjustable tapping-screw drilling tip 109;
10) Automatic-water-shedding height-adjustable tube-screw systems 110, each comprising:
11) Automatic-water-shedding height-adjustable tube-screw concave head top 111,
12) Automatic-water-shedding height-adjustable tube-screw head body 112,
13) Automatic-water-shedding height-adjustable tube-screw convex head bottom 113,
14) Automatic-water-shedding height-adjustable tube-screw water-sealing dike 114,
15) Automatic-water-shedding height-adjustable tube-screw rain-water reservoir 115,
16) Automatic-water-shedding height-adjustable tube-screw rain-water reservoir channels 116,
17) Automatic-water-shedding height-adjustable tube-screw water-sealing ridge 117,
18) Automatic-water-shedding height-adjustable tube-screw shank 118,
19) Automatic-water-shedding height-adjustable tube-screw thread 119,
20) Automatic-water-shedding height-adjustable tube-screw central shaft 120, and
21) Automatic-water-shedding height-adjustable tube-screw locking teeth 121; and
22) Automatic-water-shedding height-adjustable three-dimensionally-adjustable base system 122, comprising:
23) Automatic-water-shedding height-adjustable three-dimensionally-adjustable concave base top 123,
24) Automatic-water-shedding height-adjustable three-dimensionally-adjustable base body 124,
25) Automatic-water-shedding height-adjustable three-dimensionally-adjustable base bottom 125,
26) Automatic-water-shedding height-adjustable three-dimensionally-adjustable base threads 126,
27) Automatic-water-shedding height-adjustable three-dimensionally-adjustable base dikes 127,
28) Automatic-water-shedding height-adjustable three-dimensionally-adjustable base rain-water reservoirs 128,
29) Automatic-water-shedding height-adjustable three-dimensionally-adjustable base water-collecting sumps 129,
30) Automatic-water-shedding height-adjustable three-dimensionally-adjustable base sump ducts 130,
31) Automatic-water-shedding height-adjustable three-dimensionally-adjustable base-screw holes 131,
32) Water-evaporation-inducing-and-water-draining-inducing pads 132a,
33) Post-screw holes 132b, and
34) Post screws 132c.

Material

Referring to FIGS. 3, 4, 5, 6, 7, 8, and 9:

1) Automatic-water-shedding three-dimensionally-adjustable tapping-screw systems 101 each are made of the materials of its components.
2) Automatic-water-shedding three-dimensionally-adjustable tapping-screw convex head top 102 is made of metallic material.
3) Automatic-water-shedding three-dimensionally-adjustable tapping-screw head body 103 is made of metallic material.
4) Automatic-water-shedding three-dimensionally-adjustable tapping-screw convex head bottom 104 is made of metallic material.
5) Automatic-water-shedding three-dimensionally-adjustable tapping-screw driver slot 105 is made of empty space.
6) Automatic-water-shedding three-dimensionally-adjustable tapping-screw water-sealing ridge 106 is made of metallic material.
7) Automatic-water-shedding three-dimensionally-adjustable tapping-screw shank 107 is made of metallic material.
8) Automatic-water-shedding three-dimensionally-adjustable tapping-screw thread 108 is made of metallic material.
9) Automatic-water-shedding three-dimensionally-adjustable tapping-screw drilling tip 109 is made of metallic material.
10) Automatic-water-shedding height-adjustable tube-screw systems 110 each are made of the materials of its components.
11) Automatic-water-shedding height-adjustable tube-screw concave head top 111 is made of metallic material.
12) Automatic-water-shedding height-adjustable tube-screw head body 112 is made of metallic material.
13) Automatic-water-shedding height-adjustable tube-screw convex head bottom 113 is made of metallic material.
14) Automatic-water-shedding height-adjustable tube-screw water-sealing dike 114 is made of metallic material.
15) Automatic-water-shedding height-adjustable tube-screw rain-water reservoir 115 is made of empty space.
16) Automatic-water-shedding height-adjustable tube-screw rain-water reservoir channels 116 each are made of empty space.
17) Automatic-water-shedding height-adjustable tube-screw water-sealing ridge 117 is made of metallic material.
18) Automatic-water-shedding height-adjustable tube-screw shank 118 is made of metallic material.
19) Automatic-water-shedding height-adjustable tube-screw thread 119 is made of metallic material.
20) Automatic-water-shedding height-adjustable tube-screw central shaft 120 is made of empty space.

21) Automatic-water-shedding height-adjustable tube-screw locking teeth 121 each are made of metallic material.
22) Automatic-water-shedding height-adjustable three-dimensionally-adjustable base system 122 is made of the materials of its components.
23) Automatic-water-shedding height-adjustable three-dimensionally-adjustable concave base top 123 is made of metallic material.
24) Automatic-water-shedding height-adjustable three-dimensionally-adjustable base body 124 is made of metallic material.
25) Automatic-water-shedding height-adjustable three-dimensionally-adjustable base bottom 125 is made of metallic material.
26) Automatic-water-shedding height-adjustable three-dimensionally-adjustable base threads 126 each are made of metallic material.
27) Automatic-water-shedding height-adjustable three-dimensionally-adjustable base dikes 127 each are made of metallic material.
28) Automatic-water-shedding height-adjustable three-dimensionally-adjustable base rain-water reservoirs 128 each are made of empty space.
29) Automatic-water-shedding height-adjustable three-dimensionally-adjustable base water-collecting sumps 129 each are made of empty space.
30) Automatic-water-shedding height-adjustable three-dimensionally-adjustable base sump ducts 130 each are made of empty space.
31) Automatic-water-shedding height-adjustable three-dimensionally-adjustable base-screw holes 131 each are made of empty space.
32) Water-evaporation-inducing-and-water-draining-inducing pads 132*a* each are made of metallic material.
33) Post-screw holes 132*b* each are made of metallic material.
34) Post screws 132*c* each are made of metallic material.

Shape

Referring to FIGS. 3, 4, 5, 6, 7, 8, and 9:
1) Automatic-water-shedding three-dimensionally-adjustable tapping-screw systems 101 each have the combined shapes of its components.
2) Automatic-water-shedding three-dimensionally-adjustable tapping-screw convex head top 102 has a dome shape.
3) Automatic-water-shedding three-dimensionally-adjustable tapping-screw head body 103 has a round shape.
4) Automatic-water-shedding three-dimensionally-adjustable tapping-screw convex head bottom 104 has a convex shape.
5) Automatic-water-shedding three-dimensionally-adjustable tapping-screw driver slot 105 has an X shape.
6) Automatic-water-shedding three-dimensionally-adjustable tapping-screw water-sealing ridge 106 has a circular-ridge shape.
7) Automatic-water-shedding three-dimensionally-adjustable tapping-screw shank 107 has a cylindrical shape.
8) Automatic-water-shedding three-dimensionally-adjustable tapping-screw thread 108 has a striated shape.
9) Automatic-water-shedding three-dimensionally-adjustable tapping-screw drilling tip 109 has a conical shape.
10) Automatic-water-shedding height-adjustable tube-screw systems 110 each have the combined shapes of its components.
11) Automatic-water-shedding height-adjustable tube-screw concave head top 111 has a concave shape.
12) Automatic-water-shedding height-adjustable tube-screw head body 112 has a hexagonal shape.
13) Automatic-water-shedding height-adjustable tube-screw convex head bottom 113 has a concave shape.
14) Automatic-water-shedding height-adjustable tube-screw water-sealing dike 114 has a circular-ridge shape.
15) Automatic-water-shedding height-adjustable tube-screw rain-water reservoir 115 has a circular-trough shape.
16) Automatic-water-shedding height-adjustable tube-screw rain-water reservoir channels 116 each have a cylindrical shape.
17) Automatic-water-shedding height-adjustable tube-screw water-sealing ridge 117 has a circular-ridge shape.
18) Automatic-water-shedding height-adjustable tube-screw shank 118 has a tube shape.
19) Automatic-water-shedding height-adjustable tube-screw thread 119 has a striated shape.
20) Automatic-water-shedding height-adjustable tube-screw central shaft 120 has a cylindrical shape.
21) Automatic-water-shedding height-adjustable tube-screw locking teeth 121 each have a curved blade shape.
22) Automatic-water-shedding height-adjustable three-dimensionally-adjustable base system 122 has the combined shapes of its components.
23) Automatic-water-shedding height-adjustable three-dimensionally-adjustable concave base top 123 has a concave shape.
24) Automatic-water-shedding height-adjustable three-dimensionally-adjustable base body 124 has a square shape.
25) Automatic-water-shedding height-adjustable three-dimensionally-adjustable base bottom 125 has a flat shape.
26) Automatic-water-shedding height-adjustable three-dimensionally-adjustable base threads 126 each have a striated shape.
27) Automatic-water-shedding height-adjustable three-dimensionally-adjustable base dikes 127 each have a circular-ridge shape.
28) Automatic-water-shedding height-adjustable three-dimensionally-adjustable base rain-water reservoirs 128 each have a circular-trough shape.
29) Automatic-water-shedding height-adjustable three-dimensionally-adjustable base water-collecting sumps 129 each have a circular-trough shape.
30) Automatic-water-shedding height-adjustable three-dimensionally-adjustable base sump ducts 130 each have a cylindrical shape.
31) Automatic-water-shedding height-adjustable three-dimensionally-adjustable base-screw holes 131 each have a cylindrical shape.
32) Water-evaporation-inducing-and-water-draining-inducing pads 132*a* each have a dome shape.
33) Post-screw holes 132*b* each have a cylindrical shape.
34) Post screws 132*c* each have a screw shape.

Connection

Referring to FIGS. 3, 4, 5, 6, 7, 8, and 9:
1) Automatic-water-shedding three-dimensionally-adjustable tapping-screw systems 101 each are inserted through one automatic-water-shedding height-adjustable tube-screw central shaft 120, and each are screwed into a foundation of concrete, wood, metal, composite, or material.
2) Automatic-water-shedding three-dimensionally-adjustable tapping-screw convex head top 102 is molded to automatic-water-shedding three-dimensionally-adjustable tapping-screw head body 103.
3) Automatic-water-shedding three-dimensionally-adjustable tapping-screw head body 103 is molded to automatic-water-shedding three-dimensionally-adjustable tapping-screw convex head bottom 104.
4) Automatic-water-shedding three-dimensionally-adjustable tapping-screw convex head bottom 104 is molded to automatic-water-shedding three-dimensionally-adjustable tapping-screw shank 107.
5) Automatic-water-shedding three-dimensionally-adjustable tapping-screw driver slot 105 is molded into automatic-water-shedding three-dimensionally-adjustable tapping-screw convex head top 102.
6) Automatic-water-shedding three-dimensionally-adjustable tapping-screw water-sealing ridge 106 is molded into automatic-water-shedding three-dimensionally-adjustable tapping-screw head body 103.
7) Automatic-water-shedding three-dimensionally-adjustable tapping-screw shank 107 is molded to automatic-water-shedding three-dimensionally-adjustable tapping-screw head body 103.
8) Automatic-water-shedding three-dimensionally-adjustable tapping-screw thread 108 is molded to automatic-water-shedding three-dimensionally-adjustable tapping-screw shank 107.
9) Automatic-water-shedding three-dimensionally-adjustable tapping-screw drilling tip 109 is molded to automatic-water-shedding three-dimensionally-adjustable tapping-screw shank 107.
10) Automatic-water-shedding height-adjustable tube-screw systems 110 each are screwed through one automatic-water-shedding height-adjustable three-dimensionally-adjustable base-screw hole 131.
11) Automatic-water-shedding height-adjustable tube-screw concave head top 111 is molded to automatic-water-shedding height-adjustable tube-screw head body 112.
12) Automatic-water-shedding height-adjustable tube-screw head body 112 is molded to automatic-water-shedding height-adjustable tube-screw convex head bottom 113.
13) Automatic-water-shedding height-adjustable tube-screw convex head bottom 113 is molded to automatic-water-shedding height-adjustable tube-screw shank 118.
14) Automatic-water-shedding height-adjustable tube-screw water-sealing dike 114 is molded into automatic-water-shedding height-adjustable tube-screw concave head top 111.
15) Automatic-water-shedding height-adjustable tube-screw rain-water reservoir 115 is molded into automatic-water-shedding height-adjustable tube-screw concave head top 111.
16) Automatic-water-shedding height-adjustable tube-screw rain-water reservoir channels 116 each are molded in automatic-water-shedding height-adjustable tube-screw head body 112.
17) Automatic-water-shedding height-adjustable tube-screw water-sealing ridge 117 is molded to automatic-water-shedding height-adjustable tube-screw head body 112.
18) Automatic-water-shedding height-adjustable tube-screw shank 118 is molded to automatic-water-shedding height-adjustable tube-screw head body 112.
19) Automatic-water-shedding height-adjustable tube-screw thread 119 is molded to automatic-water-shedding height-adjustable tube-screw shank 118.
20) Automatic-water-shedding height-adjustable tube-screw central shaft 120 is molded in automatic-water-shedding height-adjustable tube-screw shank 118.
21) Automatic-water-shedding height-adjustable tube-screw locking teeth 121 each are molded to automatic-water-shedding height-adjustable tube-screw shank 118.
22) Automatic-water-shedding height-adjustable three-dimensionally-adjustable base system 122 is screwed on automatic-water-shedding height-adjustable tube-screw systems 110.
23) Automatic-water-shedding height-adjustable three-dimensionally-adjustable concave base top 123 is molded to automatic-water-shedding height-adjustable three-dimensionally-adjustable base body 124.
24) Automatic-water-shedding height-adjustable three-dimensionally-adjustable base body 124 is molded to automatic-water-shedding height-adjustable three-dimensionally-adjustable base bottom 125.
25) Automatic-water-shedding height-adjustable three-dimensionally-adjustable base bottom 125 is molded to automatic-water-shedding height-adjustable three-dimensionally-adjustable base body 124.
26) Automatic-water-shedding height-adjustable three-dimensionally-adjustable base threads 126 each are molded in automatic-water-shedding height-adjustable three-dimensionally-adjustable base body 124.
27) Automatic-water-shedding height-adjustable three-dimensionally-adjustable base dikes 127 each are molded into automatic-water-shedding height-adjustable three-dimensionally-adjustable concave base top 123.
28) Automatic-water-shedding height-adjustable three-dimensionally-adjustable base rain-water reservoirs 128 each are molded into automatic-water-shedding height-adjustable three-dimensionally-adjustable concave base top 123.
29) Automatic-water-shedding height-adjustable three-dimensionally-adjustable base water-collecting sumps 129 each are molded in automatic-water-shedding height-adjustable three-dimensionally-adjustable base body 124.
30) Automatic-water-shedding height-adjustable three-dimensionally-adjustable base sump ducts 130 each are molded in automatic-water-shedding height-adjustable three-dimensionally-adjustable base body 124.
31) Automatic-water-shedding height-adjustable three-dimensionally-adjustable base-screw holes 131 each are molded in automatic-water-shedding height-adjustable three-dimensionally-adjustable base body 124.
32) Water-evaporation-inducing-and-water-draining-inducing pads 132a each are molded to automatic-water-shedding height-adjustable three-dimensionally-adjustable base bottom 125.
33) Post-screw holes 132b each are molded in automatic-water-shedding height-adjustable three-dimensionally-adjustable base body 124.
34) Post screws 132c each are screwed through one post-screw hole 132b into a post.

Function

Referring to FIGS. 3, 4, 5, 6, 7, 8, and 9:
1) (FIGS. 4, 5, and 6)
   Automatic-water-shedding three-dimensionally-adjustable tapping-screw systems 101 each are for:
   a) Three-dimensionally adjusting themselves when screwed into a foundation or patio 133 of wood, concrete, composite, or material,
      in the directions of arrow 134;
   b) Three-dimensionally adjusting automatic-water-shedding height-adjustable three-dimensionally-adjustable base system 122;
   c) Automatically shedding rain water away from themselves, in the directions of arrows 135a and 135b;
   d) Automatically shedding rain water away from automatic-water-shedding height-adjustable three-dimensionally-adjustable base system 122,
      in the directions of arrows 136a and 136b; and e) Securing automatic-water-shedding height-adjustable three-dimensionally-adjustable base system 122 to foundation or patio 133 of wood, concrete, composite, or material.
2) Automatic-water-shedding three-dimensionally-adjustable tapping-screw convex head top 102 is for automatically shedding rain water away from automatic-water-shedding height-adjustable three-dimensionally-adjustable base system 122.
3) Automatic-water-shedding three-dimensionally-adjustable tapping-screw head body 103 is for connecting automatic-water-shedding three-dimensionally-adjustable tapping-screw convex head top 102 to automatic-water-shedding three-dimensionally-adjustable tapping-screw convex head bottom 104.
4) Automatic-water-shedding three-dimensionally-adjustable tapping-screw convex head bottom 104 is for:
   a) Providing a curved surface to three-dimensionally adjust automatic-water-shedding three-dimensionally-adjustable tapping-screw system 101 thereon; and
   b) Pressing down on automatic-water-shedding height-adjustable tube-screw concave head top 111.
5) Automatic-water-shedding three-dimensionally-adjustable tapping-screw driver slot 105 is for a screw-driver tip to be inserted in to three-dimensionally adjust and secure automatic-water-shedding height-adjustable three-dimensionally-adjustable base system 122.
6) Automatic-water-shedding three-dimensionally-adjustable tapping-screw water-sealing ridge 106 is for preventing rain water from flowing into automatic-water-shedding height-adjustable tube-screw central shaft 120.
7) Automatic-water-shedding three-dimensionally-adjustable tapping-screw shank 107 is for:
   a) Being inserted through automatic-water-shedding height-adjustable tube-screw central shaft 120; and
   b) Being screwed into foundation or patio 133 of wood, concrete, composite, or material.
8) Automatic-water-shedding three-dimensionally-adjustable tapping-screw thread 108 is for being screwed into foundation or patio 133 of wood, concrete, composite, or material to secure automatic-water-shedding height-adjustable three-dimensionally-adjustable base system 122.
9) Automatic-water-shedding three-dimensionally-adjustable tapping-screw drilling tip 109 is for drilling into foundation or patio 133 of wood, concrete, composite, or material.
10) (FIGS. 5 and 6)
    Automatic-water-shedding height-adjustable tube-screw systems 110 each are for:
    a) Automatically sheds rain water away from automatic-water-shedding three-dimensionally-adjustable tapping-screw systems 101, in the directions of arrows 136*a* and 136*b*;
    b) Automatically drains rain water away from automatic-water-shedding three-dimensionally-adjustable tapping-screw systems 101, in the directions of arrows 137*a* and 137*b*;
    c) Automatically sheds rain water away from automatic-water-shedding height-adjustable three-dimensionally-adjustable base system 122;
    d) Automatically drains rain water away from automatic-water-shedding height-adjustable three-dimensionally-adjustable base system 122;
    e) Provides a curved surface to three-dimensionally adjust automatic-water-shedding three-dimensionally-adjustable tapping-screw systems 101 thereon;
    f) Three-dimensionally adjusts the height of automatic-water-shedding height-adjustable three-dimensionally-adjustable base system 122;
    g) Bites into foundation or patio 133 of wood, concrete, composite, or material; and
    h) Secures automatic-water-shedding height-adjustable three-dimensionally-adjustable base system 122 to foundation or patio 133 of wood, concrete, composite, or material.
11) Automatic-water-shedding height-adjustable tube-screw concave head top 111 is for providing a curved surface to three-dimensionally adjust automatic-water-shedding three-dimensionally-adjustable tapping-screw systems 101 thereon.
12) Automatic-water-shedding height-adjustable tube-screw head body 112 is for connecting automatic-water-shedding height-adjustable tube-screw concave head top 111 to automatic-water-shedding height-adjustable tube-screw convex head bottom 113.
13) Automatic-water-shedding height-adjustable tube-screw convex head bottom 113 is for connecting automatic-water-shedding height-adjustable tube-screw head body 112 to automatic-water-shedding height-adjustable tube-screw shank 118.
14) Automatic-water-shedding height-adjustable tube-screw water-sealing dike 114 is for preventing rain water from flowing into automatic-water-shedding height-adjustable tube-screw central shaft 120.
15) Automatic-water-shedding height-adjustable tube-screw rain-water reservoir 115 is for directing rain water into automatic-water-shedding height-adjustable tube-screw rain-water reservoir channels 116.
16) Automatic-water-shedding height-adjustable tube-screw rain-water reservoir channels 116 each are for directing rain water into automatic-water-shedding height-adjustable three-dimensionally-adjustable base rain-water reservoirs 128.
17) Automatic-water-shedding height-adjustable tube-screw water-sealing ridge 117 is for preventing rain water from flowing into automatic-water-shedding height-adjustable three-dimensionally-adjustable base-screw holes 131.
18) Automatic-water-shedding height-adjustable tube-screw shank 118 is for being screwed into automatic-water-shedding height-adjustable three-dimensionally-adjustable base-screw holes 131.
19) Automatic-water-shedding height-adjustable tube-screw thread 119 is for being screwed on automatic-water-shedding height-adjustable three-dimensionally-adjustable base threads 126.
20) Automatic-water-shedding height-adjustable tube-screw central shaft 120 is for automatic-water-shedding three-dimensionally-adjustable tapping-screw shank 107 to be inserted therethrough.
21) Automatic-water-shedding height-adjustable tube-screw locking teeth 121 each are for:
    a) Biting into foundation or patio 133 of wood, concrete, composite, or material; and
    b) Securing automatic-water-shedding height-adjustable tube-screw systems 110 to foundation or patio 133 of wood, concrete, composite, or material.
22) (FIGS. 5, 6, and 7)
    Automatic-water-shedding height-adjustable three-dimensionally-adjustable base system 122 is for:
    a) Automatically shedding rain water away from itself, in the directions of arrows 136*a* and 136*b*;
    b) Automatically draining rain water away from itself, in the directions of arrows 138*a* and 138*b*;

c) Automatically allowing rain water to flow away from itself,
in the directions of arrows 139*a* and 139*b*,
by creating empty spaces between itself and foundation or patio 133 of wood, concrete, composite, or material;
d) Automatically allowing rain water to evaporate away from itself,
in the directions of arrows 139*a* and 139*b*,
by creating empty spaces between itself and foundation or patio 133 of wood, concrete, composite, or material;
e) Adjusting the height of a fence post when attached to base system 122;
f) Biting into foundation or patio 133 of wood, concrete, composite, or material;
g) Supporting a fence post when attached to base system 122; and
h) Securing a fence post to foundation or patio 133 of wood, concrete, composite, or material.

23) Automatic-water-shedding height-adjustable three-dimensionally-adjustable concave base top 123 is for automatically shedding rain water away from itself.

24) Automatic-water-shedding height-adjustable three-dimensionally-adjustable base body 124 is for connecting automatic-water-shedding height-adjustable three-dimensionally-adjustable concave base top 123 to automatic-water-shedding height-adjustable three-dimensionally-adjustable base bottom 125.

25) Automatic-water-shedding height-adjustable three-dimensionally-adjustable base bottom 125 is for connecting automatic-water-shedding height-adjustable three-dimensionally-adjustable base body 124 to water-evaporation-inducing-and-water-draining-inducing pads 132.

26) Automatic-water-shedding height-adjustable three-dimensionally-adjustable base threads 126 each are for screwing automatic-water-shedding height-adjustable tube-screw thread 119 thereon.

27) Automatic-water-shedding height-adjustable three-dimensionally-adjustable base dikes 127 each are for preventing rain water from flowing into one automatic-water-shedding height-adjustable three-dimensionally-adjustable base-screw hole 131.

28) Automatic-water-shedding height-adjustable three-dimensionally-adjustable base rain-water reservoirs 128 each are for directing rain water into one automatic-water-shedding height-adjustable three-dimensionally-adjustable base water-collecting sump 129.

29) Automatic-water-shedding height-adjustable three-dimensionally-adjustable base water-collecting sumps 129 each are for are for directing rain water into automatic-water-shedding height-adjustable three-dimensionally-adjustable base sump ducts 130.

30) Automatic-water-shedding height-adjustable three-dimensionally-adjustable base sump ducts 130 each are for draining rain water away from automatic-water-shedding height-adjustable three-dimensionally-adjustable base system 122.

31) Automatic-water-shedding height-adjustable three-dimensionally-adjustable base-screw holes 131 each are for one automatic-water-shedding height-adjustable tube-screw system 110 to be crewed therein.

32) Water-evaporation-inducing-and-water-draining-inducing pads 132*a* each are for:
a) Lifting automatic-water-shedding height-adjustable three-dimensionally-adjustable base system 122 up from foundation or patio 133 of wood, concrete, composite, or material to create an empty space therebetween; and
b) Automatically allowing rain water to evaporate away from automatic-water-shedding height-adjustable three-dimensionally-adjustable base system 122 and foundation or patio 133 of wood, concrete, composite, or material,
in the directions of arrows 139*a* and 139*b*,
by creating an empty space therebetween.

33) Post-screw holes 132*b* each are for one post screw 132*c* to be screwed therethrough.

34) Post screws 132*c* each are for screwing through one post-screw hole 132*b* into a post, to secure automatic-water-shedding height-adjustable three-dimensionally-adjustable base system 122 to the post.

Operation

Referring to FIGS. 10, 11, 12, 13, 14, and 15, the operation of the unique automatic-water-shedding height-adjustable three-dimensionally-adjustable fence-post-base system, having water-sealing ridges and dikes, water-draining reservoirs and sumps, water-draining channels and ducts, fence-post-base-lifting pads, base-height-adjusting tube screws, and tube-screw-locking teeth (to shed and drain rain water away from the unique fence-post-base system, to allow rain water to evaporate away from under the unique fence-post-base system, and to lock the unique fence-post-base system to a foundation), comprises:

1) (FIG. 10)
Screwing post screws 132*c* through post-screw holes 132*b* into a post, to secure automatic-water-shedding height-adjustable three-dimensionally-adjustable base system 122 to the post, respectively;

2) (FIG. 10)
Positioning automatic-water-shedding height-adjustable three-dimensionally-adjustable base system 122 on foundation or patio 133 of wood, concrete, composite, or material;

3) (FIG. 11)
Screwing automatic-water-shedding height-adjustable tube-screw systems 110 through automatic-water-shedding height-adjustable three-dimensionally-adjustable base-screw holes 131, respectively,
in the directions of arrows 140*a* and 140*b*;

4) (FIG. 12)
Rotating automatic-water-shedding height-adjustable tube-screw systems 110,
in the directions of arrows 141*a* and 141*b*,
to three-dimensionally adjust the height of automatic-water-shedding height-adjustable three-dimensionally-adjustable base system 122, to level it;

5) (FIG. 13)
Inserting automatic-water-shedding three-dimensionally-adjustable tapping-screw systems 101 through automatic-water-shedding height-adjustable tube-screw central shafts 120 of automatic-water-shedding height-adjustable tube-screw systems 110, respectively,
in the directions of arrows 142*a* and 142*b*;

6) (FIG. 14)
Screwing automatic-water-shedding three-dimensionally-adjustable tapping-screw systems 101 into foundation or patio 133,
in the direction of arrow 143
such that
automatic-water-shedding three-dimensionally-adjustable tapping-screw systems 101 three-dimensionally adjust themselves, in the directions of arrow 144 (FIG. 15),
to secure automatic-water-shedding height-adjustable three-dimensionally-adjustable base system 122 and automatic-water-shedding height-adjustable tube-screw systems 110.

Referring to FIGS. 15, 16, 17, 18, and 19, resulting from the above operation of the unique automatic-water-shedding height-adjustable three-dimensionally-adjustable fence-post-base system, some major advantages are as follows:

1) (FIGS. 15, 16, and 17)
    Automatic-water-shedding three-dimensionally-adjustable tapping-screw systems 101 each:
        a) Three-dimensionally adjust themselves when screwed into foundation or patio 133 of wood, concrete, composite, or material,
            in the directions of arrow 134;
        b) Three-dimensionally adjust automatic-water-shedding height-adjustable three-dimensionally-adjustable base system 122;
        c) Automatically shed rain water away from themselves,
            in the directions of arrows 135a and 135b;
        d) Automatically shed rain water away from automatic-water-shedding height-adjustable three-dimensionally-adjustable base system 122,
            in the directions of arrows 136a and 136b; and
        e) Secure automatic-water-shedding height-adjustable three-dimensionally-adjustable base system 122 to foundation or patio 133 of wood, concrete, composite, or material.
2) (FIGS. 15, 16, and 17)
    Automatic-water-shedding three-dimensionally-adjustable tapping-screw convex head bottom 104:
        a) Provides a curved surface to three-dimensionally adjust automatic-water-shedding three-dimensionally-adjustable tapping-screw system 101 thereon; and
        b) Presses down on automatic-water-shedding height-adjustable tube-screw concave head top 111.
3) (FIGS. 16 and 17)
    Automatic-water-shedding height-adjustable tube-screw systems 110 each:
        a) Automatically shed rain water away from automatic-water-shedding three-dimensionally-adjustable tapping-screw systems 101,
            in the directions of arrows 136a and 136b;
        b) Automatically drain rain water away from automatic-water-shedding three-dimensionally-adjustable tapping-screw systems 101,
            in the directions of arrows 137a and 137b;
        c) Automatically shed rain water away from automatic-water-shedding height-adjustable three-dimensionally-adjustable base system 122;
        d) Automatically drain rain water away from automatic-water-shedding height-adjustable three-dimensionally-adjustable base system 122;
        e) Provide a curved surface to three-dimensionally adjust automatic-water-shedding three-dimensionally-adjustable tapping-screw systems 101 thereon;
        f) Three-dimensionally adjust the height of automatic-water-shedding height-adjustable three-dimensionally-adjustable base system 122;
        g) Bite into foundation or patio 133 of wood, concrete, composite, or material; and
        h) Secure automatic-water-shedding height-adjustable three-dimensionally-adjustable base system 122 to foundation or patio 133 of wood, concrete, composite, or material.
4) (FIGS. 16 and 17)
    Automatic-water-shedding height-adjustable tube-screw water-sealing dike 114:
        Prevents rain water from flowing into automatic-water-shedding height-adjustable tube-screw central shaft 120.
5) (FIGS. 16 and 17)
    Automatic-water-shedding height-adjustable tube-screw rain-water reservoir 115:
        Directs rain water into automatic-water-shedding height-adjustable tube-screw rain-water reservoir channels 116.
6) (FIGS. 16 and 17)
    Automatic-water-shedding height-adjustable tube-screw rain-water reservoir channels 116 each:
        Direct rain water into automatic-water-shedding height-adjustable three-dimensionally-adjustable base rain-water reservoirs 128.
7) (FIGS. 16 and 17)
    Automatic-water-shedding height-adjustable tube-screw water-sealing ridge 117:
        Prevents rain water from flowing into automatic-water-shedding height-adjustable three-dimensionally-adjustable base-screw holes 131.
8) (FIGS. 16 and 17)
    Automatic-water-shedding height-adjustable tube-screw locking teeth 121 each:
        a) Bite into foundation or patio 133 of wood, concrete, composite, or material; and
        b) Secure automatic-water-shedding height-adjustable tube-screw systems 110 to foundation or patio 133 of wood, concrete, composite, or material.
9) (FIGS. 16, 17, 18, and 19)
    Automatic-water-shedding height-adjustable three-dimensionally-adjustable base system 122:
        a) Automatically sheds rain water away from itself,
            in the directions of arrows 136a and 136b;
        b) Automatically drains rain water away from itself,
            in the directions of arrows 138a and 138b;
        c) Automatically allows rain water to flow away from itself,
            in the directions of arrows 139a and 139b,
            by creating empty spaces between itself and foundation or patio 133 of wood, concrete, composite, or material;
        d) Automatically allows rain water to evaporate away from itself,
            in the directions of arrows 139a and 139b,
            by creating empty spaces between itself and foundation or patio 133 of wood, concrete, composite, or material;
        e) Adjusts the height of a fence post when attached to base system 122;
        f) Bites into foundation or patio 133 of wood, concrete, composite, or material;
        g) Supports a fence post when attached to base system 122; and
        h) Secures a fence post to foundation or patio 133 of wood, concrete, composite, or material.

10) (FIGS. 16, 17, 18, and 19)
    Automatic-water-shedding height-adjustable three-dimensionally-adjustable base dikes 127 each:
        Prevent rain water from flowing into one automatic-water-shedding height-adjustable three-dimensionally-adjustable base-screw hole 131.
11) (FIGS. 16, 17, 18, and 19)
    Automatic-water-shedding height-adjustable three-dimensionally-adjustable base rain-water reservoirs 128 each:
        Direct rain water into one automatic-water-shedding height-adjustable three-dimensionally-adjustable base water-collecting sump 129.
12) (FIGS. 16, 17, 18, and 19)
    Automatic-water-shedding height-adjustable three-dimensionally-adjustable base water-collecting sumps 129 each:
        Direct rain water into automatic-water-shedding height-adjustable three-dimensionally-adjustable base sump ducts 130.
13) (FIGS. 16, 17, 18, and 19)
    Automatic-water-shedding height-adjustable three-dimensionally-adjustable base sump ducts 130 each:
        Drain rain water away from automatic-water-shedding height-adjustable three-dimensionally-adjustable base system 122.
14) (FIGS. 16, 17, 18, and 19)
    Water-evaporation-inducing-and-water-draining-inducing pads 132 each:
        a) Lift automatic-water-shedding height-adjustable three-dimensionally-adjustable base system 122 up from foundation or patio 133 of wood, concrete, composite, or material to create an empty space therebetween; and
        b) Automatically allow rain water to evaporate away from automatic-water-shedding height-adjustable three-dimensionally-adjustable base system 122 and foundation or patio 133 of wood, concrete, composite, or material,
            in the directions of arrows 139*a* and 139*b*,
            by creating an empty space therebetween.
Variation Each component of the unique automatic-water-shedding height-adjustable three-dimensionally-adjustable fence-post-base system can have any shape and size.

For example, the head top or head bottom of each tapping-screw system and/or tube-screw system of the unique automatic-water-shedding height-adjustable three-dimensionally-adjustable fence-post-base system can be convex, concave, wavy, or flat.

For another example, the base top or base bottom of the base system of the unique automatic-water-shedding height-adjustable three-dimensionally-adjustable fence-post-base system can be convex, concave, wavy, or flat.

The unique automatic-water-shedding height-adjustable three-dimensionally-adjustable fence-post-base system can be built with or without any driver slot, ridge, dike, reservoir, channel, teeth, sump, duct, and/or pad.

Figure 20:
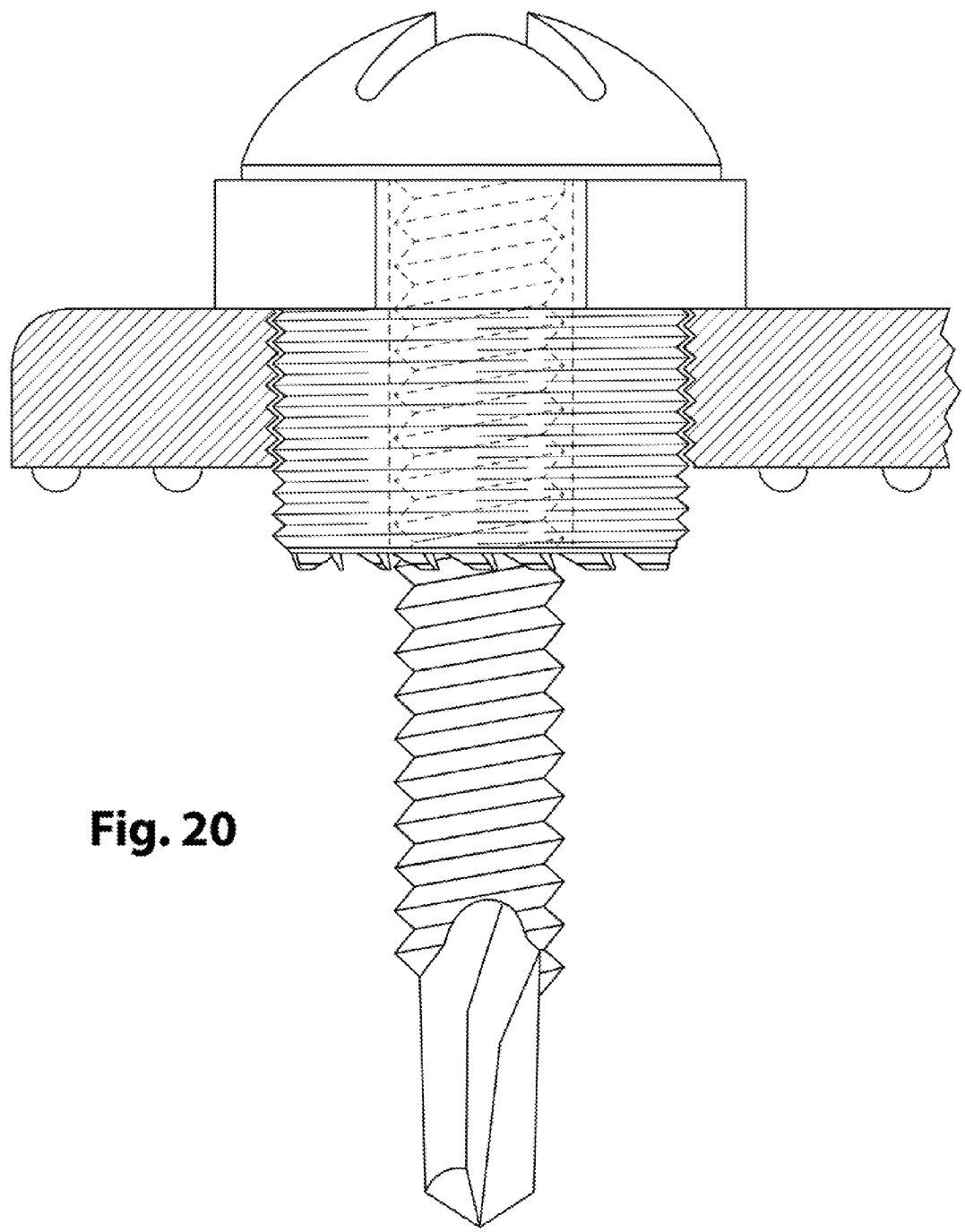
FIGS. 20 and 21 illustrate front views of variations of the unique automatic-water-shedding height-adjustable three-dimensionally-adjustable fence-post-base system.

For example, FIG. 20 illustrates an equivalent of the unique automatic-water-shedding height-adjustable three-dimensionally-adjustable fence-post-base system.

Figure 21:
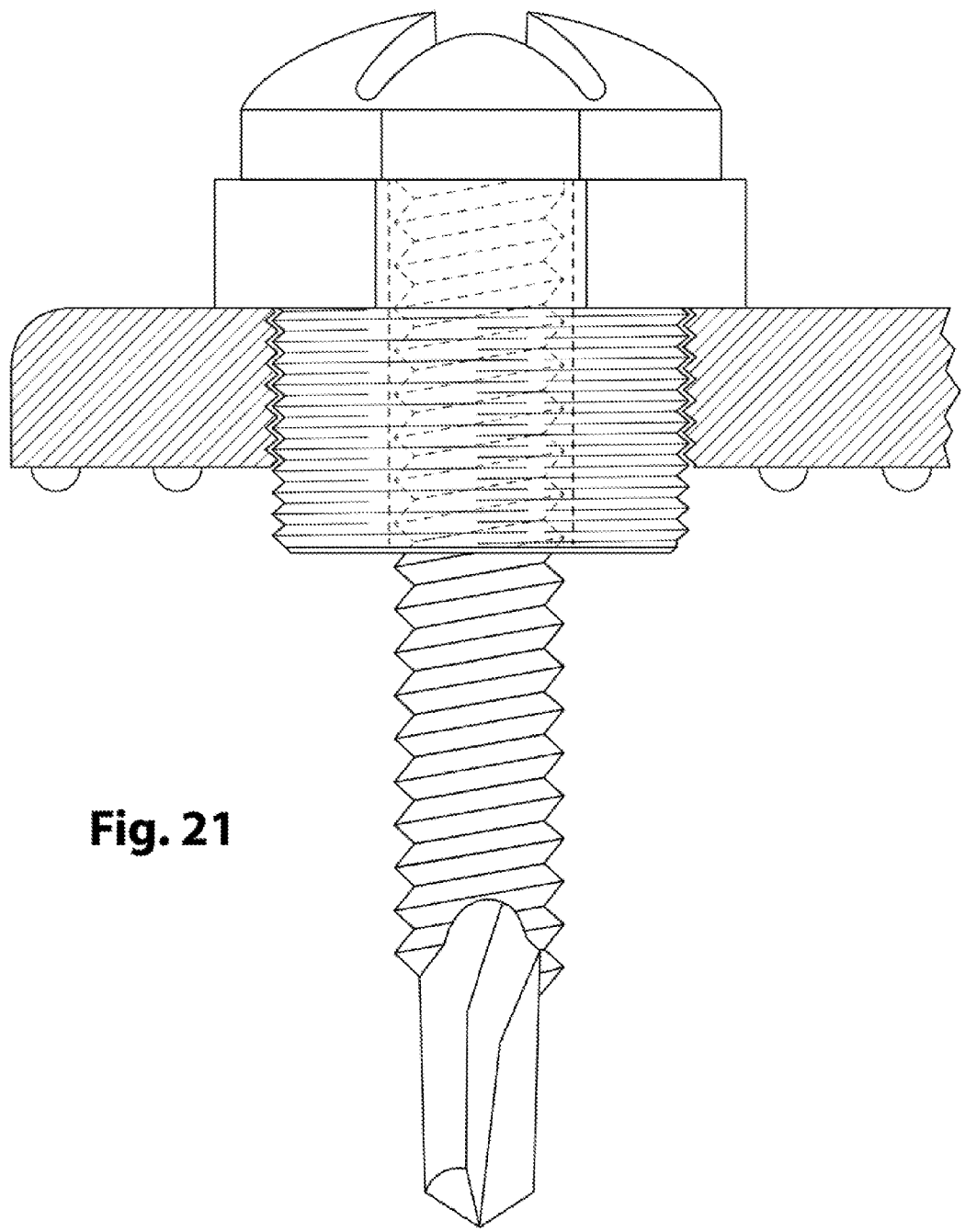

For example, FIG. 21 illustrates a tapping-screw system, having a hexagonal body. The tapping-screw system is equivalent to automatic-water-shedding three-dimensionally-adjustable tapping-screw system 101.

Major Advantages of the Invention

The new invention substantially departs from the conventional concepts and designs of the prior art. In doing so, the new invention provides a
unique automatic-water-shedding height-adjustable three-dimensionally-adjustable fence-post-base system
having many unique and significant features, functions, and advantages, which overcome all the disadvantages of the prior art, as follows:
1) It is an object of the new invention to provide a unique automatic-water-shedding height-adjustable three-dimensionally-adjustable fence-post-base system,
    having
    automatic-water-shedding three-dimensionally-adjustable tapping-screw convex head bottom 104 and
    automatic-water-shedding height-adjustable tube-screw concave head top 111.
    Therefore, the unique automatic-water-shedding height-adjustable three-dimensionally-adjustable fence-post-base system:
        a) Can allow automatic-water-shedding three-dimensionally-adjustable tapping-screw systems 101 to rotate 360 degrees
            to adjust the elevation of the unique automatic-water-shedding height-adjustable three-dimensionally-adjustable fence-post-base system;
        b) Can allow automatic-water-shedding three-dimensionally-adjustable tapping-screw systems 101 to lean in any direction
            to three-dimensionally adjust the angle of the unique automatic-water-shedding height-adjustable three-dimensionally-adjustable fence-post-base system;
        c) Can allow each of automatic-water-shedding three-dimensionally-adjustable tapping-screw systems 101 to independently adjust at an independent angle as it penetrates inconsistent materials
            to allow the unique automatic-water-shedding height-adjustable three-dimensionally-adjustable fence-post-base system to remain perpendicular to the ground; and
        d) Can provide a solid, adjustable, four-point, permanent connection to the patio, the pool floor, etc. (such as, concrete, wood, tile, or composite surface)
            to secure the unique automatic-water-shedding height-adjustable three-dimensionally-adjustable fence-post-base system thereto.
2) It is another object of the new invention to provide a unique automatic-water-shedding height-adjustable three-dimensionally-adjustable fence-post-base system,
    having
    automatic-water-shedding three-dimensionally-adjustable tapping-screw water-sealing ridge 106 and
    automatic-water-shedding height-adjustable tube-screw water-sealing dike 114.
    Therefore, the unique automatic-water-shedding height-adjustable three-dimensionally-adjustable fence-post-base system:
        a) Can prevent pool water and rainwater from getting on automatic-water-shedding three-dimensionally-adjustable tapping-screw thread 108
            to prevent automatic-water-shedding three-dimensionally-adjustable tapping-screw thread 108 from corrosion;

b) Can prevent pool water and rainwater from getting into the drilled holes in the patio, the pool floor, etc. (such as, concrete, wood, tile, or composite surface) to prevent the patio, the pool floor, etc. from rotting away.

3) It is a further object of the new invention to provide a unique automatic-water-shedding height-adjustable three-dimensionally-adjustable fence-post-base system,
having
automatic-water-shedding height-adjustable tube-screw convex head bottom 113
and
automatic-water-shedding height-adjustable three-dimensionally-adjustable concave base top 123.

Therefore, the unique automatic-water-shedding height-adjustable three-dimensionally-adjustable fence-post-base system:
  a) Can allow automatic-water-shedding height-adjustable tube-screw systems 110 to rotate 360 degrees
    to adjust the elevation of the unique automatic-water-shedding height-adjustable three-dimensionally-adjustable fence-post-base system;
  b) Can secure automatic-water-shedding height-adjustable tube-screw systems 110 inside automatic-water-shedding height-adjustable three-dimensionally-adjustable base system 122
    to three-dimensionally adjust the angle of the unique automatic-water-shedding height-adjustable three-dimensionally-adjustable fence-post-base system;
  c) Can allow each of automatic-water-shedding three-dimensionally-adjustable tapping-screw systems 101 to independently adjust at an independent angle as it penetrates inconsistent materials
    to allow the unique automatic-water-shedding height-adjustable three-dimensionally-adjustable fence-post-base system to remain perpendicular to the ground; and
  d) Can provide a solid, adjustable, four-point, permanent connection to the patio, the pool floor, etc. (such as, concrete, wood, tile, or composite surface)
    to secure the unique automatic-water-shedding height-adjustable three-dimensionally-adjustable fence-post-base system thereto.

4) It is an even further object of the new invention to provide a unique automatic-water-shedding height-adjustable three-dimensionally-adjustable fence-post-base system,
having
automatic-water-shedding height-adjustable tube-screw rain-water reservoir 115.

Therefore, the unique automatic-water-shedding height-adjustable three-dimensionally-adjustable fence-post-base system:
  a) Can store poll water and rainwater therein
    to prevent pool water and rainwater from getting into the drilled holes made by automatic-water-shedding three-dimensionally-adjustable tapping-screw drilling tip 109 in the patio, the pool floor, etc. (such as, concrete, wood, tile, or composite surface)
    to prevent the patio, the pool floor, etc. from rotting away; and
  b) Can keep pool water and rainwater away from automatic-water-shedding three-dimensionally-adjustable tapping-screw systems 101 and automatic-water-shedding height-adjustable tube-screw systems 110
    to prevent accelerated corrosion to the components of the unique automatic-water-shedding height-adjustable three-dimensionally-adjustable fence-post-base system.

5) It is another object of the new invention to provide a unique automatic-water-shedding height-adjustable three-dimensionally-adjustable fence-post-base system,
having
automatic-water-shedding height-adjustable tube-screw rain-water reservoir channels 116.

Therefore, the unique automatic-water-shedding height-adjustable three-dimensionally-adjustable fence-post-base system:
  a) Can drain pool water and rainwater away from the components of the unique automatic-water-shedding height-adjustable three-dimensionally-adjustable fence-post-base system
    to prevent accelerated corrosion to the components of the unique automatic-water-shedding height-adjustable three-dimensionally-adjustable fence-post-base system;
  b) Can allow pool water and rainwater to evaporate therethrough
    to prevent accelerated corrosion to the components of the unique automatic-water-shedding height-adjustable three-dimensionally-adjustable fence-post-base system; and
  c) Can channel pool water and rainwater through and away from the components of the unique automatic-water-shedding height-adjustable three-dimensionally-adjustable fence-post-base system
    to prevent the growth of mold, and mildew to eliminate an unhealthy environment.

6) It is yet another object of the new invention to provide a unique automatic-water-shedding height-adjustable three-dimensionally-adjustable fence-post-base system,
having
automatic-water-shedding height-adjustable tube-screw water-sealing ridge 117
and
automatic-water-shedding height-adjustable three-dimensionally-adjustable base dikes 127.

Therefore, the unique automatic-water-shedding height-adjustable three-dimensionally-adjustable fence-post-base system:
  a) Can prevent pool water and rainwater from getting on automatic-water-shedding three-dimensionally-adjustable tapping-screw thread 108
    to prevent automatic-water-shedding three-dimensionally-adjustable tapping-screw thread 108 from corrosion; and
  b) Can prevent pool water and rainwater from getting into the drilled holes ma by automatic-water-shedding three-dimensionally-adjustable tapping-screw drilling tip 109 in the patio, the pool floor, etc. (such as, concrete, wood, tile, or composite surface)
    to prevent the patio, the pool floor, etc. from rotting away.

7) It is still yet another object of the new invention to provide a unique automatic-water-shedding height-adjustable three-dimensionally-adjustable fence-post-base system,
having
automatic-water-shedding height-adjustable tube-screw locking teeth 121.

Therefore, the unique automatic-water-shedding height-adjustable three-dimensionally-adjustable fence-post-base system:
a) Can bite into the patio, the pool floor, etc. (such as, concrete, wood, tile, or composite surface)
to secure automatic-water-shedding three-dimensionally-adjustable tapping-screw systems 101, automatic-water-shedding height-adjustable tube-screw systems 110, and automatic-water-shedding height-adjustable three-dimensionally-adjustable base system 122 to the patio, the pool floor, etc.; and
b) Can bite into the patio, the pool floor, etc. (such as, concrete, wood, tile, or composite surface)
to prevent automatic-water-shedding height-adjustable tube-screw systems 110 from unscrewing themselves.

8) It is still yet an even further object of the new invention to provide a unique automatic-water-shedding height-adjustable three-dimensionally-adjustable fence-post-base system,
having
automatic-water-shedding height-adjustable three-dimensionally-adjustable base rain-water reservoirs 128 and automatic-water-shedding height-adjustable three-dimensionally-adjustable base water-collecting sumps 129.
Therefore, the unique automatic-water-shedding height-adjustable three-dimensionally-adjustable fence-post-base system:
a) Can store poll water and rainwater therein
to prevent pool water and rainwater from getting into the drilled holes made by automatic-water-shedding three-dimensionally-adjustable tapping-screw drilling tip 109 in the patio, the pool floor, etc.
to prevent the patio, the pool floor, etc. (such as, concrete, wood, tile, or composite surface) from rotting away; and
b) Can keep pool water and rainwater away from automatic-water-shedding three-dimensionally-adjustable tapping-screw systems 101 and automatic-water-shedding height-adjustable tube-screw systems 110
to prevent accelerated corrosion to the components of the unique automatic-water-shedding height-adjustable three-dimensionally-adjustable fence-post-base system.

9) It is still yet an even further object of the new invention to provide a unique automatic-water-shedding height-adjustable three-dimensionally-adjustable fence-post-base system,
having
automatic-water-shedding height-adjustable three-dimensionally-adjustable base sump ducts 130.
Therefore, the unique automatic-water-shedding height-adjustable three-dimensionally-adjustable fence-post-base system:
a) Can drain pool water and rainwater away from the components of the unique automatic-water-shedding height-adjustable three-dimensionally-adjustable fence-post-base system
to prevent accelerated corrosion to the components of the unique automatic-water-shedding height-adjustable three-dimensionally-adjustable fence-post-base system;
b) Can allow pool water and rainwater to evaporate therethrough
to prevent accelerated corrosion to the components of the unique automatic-water-shedding height-adjustable three-dimensionally-adjustable fence-post-base system; and
c) Can channel pool water and rainwater through and away from the components of the unique automatic-water-shedding height-adjustable three-dimensionally-adjustable fence-post-base system
to prevent the growth of mold, and mildew to eliminate an unhealthy environment.

10) It is still yet an even further object of the new invention to provide a unique automatic-water-shedding height-adjustable three-dimensionally-adjustable fence-post-base system,
having
water-evaporation-inducing-and-water-draining-inducing pads 132a.
Therefore, the unique automatic-water-shedding height-adjustable three-dimensionally-adjustable fence-post-base system:
a) Can channel pool water and rainwater through and away from the components of the unique automatic-water-shedding height-adjustable three-dimensionally-adjustable fence-post-base system
to prevent the growth of mold, and mildew to eliminate an unhealthy environment;
b) Can allow pool water and rainwater to evaporate therethrough
to prevent accelerated corrosion to the components of the unique automatic-water-shedding height-adjustable three-dimensionally-adjustable fence-post-base system; and
c) Can allows air to freely circulate through the unique automatic-water-shedding height-adjustable three-dimensionally-adjustable fence-post-base system
to promote a quickly drying surface and space below the unique automatic-water-shedding height-adjustable three-dimensionally-adjustable fence-post-base system.

What is claimed is:
1. An automatic-water-shedding height-adjustable three-dimensionally-adjustable fence-post-base system comprising:
automatic-water-shedding three-dimensionally-adjustable tapping-screw systems, each of said automatic-water-shedding three-dimensionally-adjustable tapping-screw systems comprising:
an automatic-water-shedding three-dimensionally-adjustable tapping-screw convex head top,
an automatic-water-shedding three-dimensionally-adjustable tapping-screw head body,
an automatic-water-shedding three-dimensionally-adjustable tapping-screw convex head bottom,
an automatic-water-shedding three-dimensionally-adjustable tapping-screw driver slot,
an automatic-water-shedding three-dimensionally-adjustable tapping-screw water-sealing ridge,
an automatic-water-shedding three-dimensionally-adjustable tapping-screw shank,
an automatic-water-shedding three-dimensionally-adjustable tapping-screw thread, and
an automatic-water-shedding three-dimensionally-adjustable tapping-screw drilling tip;

automatic-water-shedding height-adjustable tube-screw systems, each of said automatic-water-shedding height-adjustable tube-screw systems comprising:
  an automatic-water-shedding height-adjustable tube-screw concave head top,
  an automatic-water-shedding height-adjustable tube-screw head body,
  an automatic-water-shedding height-adjustable tube-screw convex head bottom,
  an automatic-water-shedding height-adjustable tube-screw water-sealing dike,
  an automatic-water-shedding height-adjustable tube-screw water reservoir,
  automatic-water-shedding height-adjustable tube-screw water reservoir channels,
  an automatic-water-shedding height-adjustable tube-screw water-sealing ridge,
  an automatic-water-shedding height-adjustable tube-screw shank,
  an automatic-water-shedding height-adjustable tube-screw thread, and
  automatic-water-shedding height-adjustable tube-screw locking teeth; and
automatic-water-shedding height-adjustable three-dimensionally-adjustable base system, said automatic-water-shedding height-adjustable three-dimensionally-adjustable base system comprising:
  an automatic-water-shedding height-adjustable three-dimensionally-adjustable concave base top,
  an automatic-water-shedding height-adjustable three-dimensionally-adjustable base body,
  an automatic-water-shedding height-adjustable three-dimensionally-adjustable base bottom,
  automatic-water-shedding height-adjustable three-dimensionally-adjustable base threads,
  automatic-water-shedding height-adjustable three-dimensionally-adjustable base dikes,
  automatic-water-shedding height-adjustable three-dimensionally-adjustable base water reservoirs,
  automatic-water-shedding height-adjustable three-dimensionally-adjustable base water-collecting sumps,
  automatic-water-shedding height-adjustable three-dimensionally-adjustable base sump ducts,
  automatic-water-shedding height-adjustable three-dimensionally-adjustable base-screw holes,
  water-evaporation-inducing-and-water-draining-inducing pads,
  post-screw holes, and
  post screws,
wherein
  said automatic-water-shedding three-dimensionally-adjustable tapping-screw convex head top
  is molded to said automatic-water-shedding three-dimensionally-adjustable tapping-screw head body,
  said automatic-water-shedding three-dimensionally-adjustable tapping-screw head body is molded to said automatic-water-shedding three-dimensionally-adjustable tapping-screw convex head bottom,
  said automatic-water-shedding three-dimensionally-adjustable tapping-screw convex head bottom is molded to said automatic-water-shedding three-dimensionally-adjustable tapping-screw shank,
  said automatic-water-shedding three-dimensionally-adjustable tapping-screw driver slot is molded into said automatic-water-shedding three-dimensionally-adjustable tapping-screw convex head top,
  said automatic-water-shedding three-dimensionally-adjustable tapping-screw water-sealing ridge is molded into said automatic-water-shedding three-dimensionally-adjustable tapping-screw head body,
  said automatic-water-shedding three-dimensionally-adjustable tapping-screw shank is molded to said automatic-water-shedding three-dimensionally-adjustable tapping-screw head body,
  said automatic-water-shedding three-dimensionally-adjustable tapping-screw thread is molded to said automatic-water-shedding three-dimensionally-adjustable tapping-screw shank,
  said automatic-water-shedding three-dimensionally-adjustable tapping-screw drilling tip is molded to said automatic-water-shedding three-dimensionally-adjustable tapping-screw shank,
  said automatic-water-shedding height-adjustable tube-screw concave head top
  is molded to said automatic-water-shedding height-adjustable tube-screw head body,
  said automatic-water-shedding height-adjustable tube-screw head body
  is molded to said automatic-water-shedding height-adjustable tube-screw convex head bottom,
  said automatic-water-shedding height-adjustable tube-screw convex head bottom
  is molded to said automatic-water-shedding height-adjustable tube-screw shank,
  said automatic-water-shedding height-adjustable tube-screw water-sealing dike
  is molded into said automatic-water-shedding height-adjustable tube-screw concave head top,
  said automatic-water-shedding height-adjustable tube-screw water reservoir
  is molded into said automatic-water-shedding height-adjustable tube-screw concave head top,
  said automatic-water-shedding height-adjustable tube-screw water reservoir channels
  are molded in said automatic-water-shedding height-adjustable tube-screw head body,
  said automatic-water-shedding height-adjustable tube-screw water-sealing ridge
  is molded to said automatic-water-shedding height-adjustable tube-screw head body,
  said automatic-water-shedding height-adjustable tube-screw shank
  is molded to said automatic-water-shedding height-adjustable tube-screw head body,
  said automatic-water-shedding height-adjustable tube-screw thread
  is molded to said automatic-water-shedding height-adjustable tube-screw shank,
  said automatic-water-shedding height-adjustable tube-screw central shaft
  is molded in said automatic-water-shedding height-adjustable tube-screw shank,
  said automatic-water-shedding height-adjustable tube-screw locking teeth
  are molded to said automatic-water-shedding height-adjustable tube-screw shank,
  said automatic-water-shedding height-adjustable three-dimensionally-adjustable concave base top is molded to said automatic-water-shedding height-adjustable three-dimensionally-adjustable base body,
  said automatic-water-shedding height-adjustable three-dimensionally-adjustable base body is molded to said automatic-water-shedding height-adjustable three-dimensionally-adjustable base bottom,
said automatic-water-shedding height-adjustable three-dimensionally-adjustable base bottom
is molded to said automatic-water-shedding height-adjustable three-dimensionally-adjustable base body,
said automatic-water-shedding height-adjustable three-dimensionally-adjustable base threads
are molded in said automatic-water-shedding height-adjustable three-dimensionally-adjustable base body,
said automatic-water-shedding height-adjustable three-dimensionally-adjustable base dikes
are molded into said automatic-water-shedding height-adjustable three-dimensionally-adjustable concave base top,
said automatic-water-shedding height-adjustable three-dimensionally-adjustable base rain-water reservoirs are molded into said automatic-water-shedding height-adjustable three-dimensionally-adjustable concave base top,
said automatic-water-shedding height-adjustable three-dimensionally-adjustable base water-collecting sumps are molded in said automatic-water-shedding height-adjustable three-dimensionally-adjustable base body,
said automatic-water-shedding height-adjustable three-dimensionally-adjustable base sump ducts are molded in said automatic-water-shedding height-adjustable three-dimensionally-adjustable base body,
said automatic-water-shedding height-adjustable three-dimensionally-adjustable base-screw holes are molded in said automatic-water-shedding height-adjustable three-dimensionally-adjustable base body,
said water-evaporation-inducing-and-water-draining-inducing pads are molded to said automatic-water-shedding height-adjustable three-dimensionally-adjustable base bottom, and
said post-screw holes
are molded in said automatic-water-shedding height-adjustable three-dimensionally-adjustable base body,
wherein
said automatic-water-shedding three-dimensionally-adjustable tapping-screw convex head top
is for
automatically shedding water away,
said automatic-water-shedding three-dimensionally-adjustable tapping-screw head body
is for
connecting said automatic-water-shedding three-dimensionally-adjustable tapping-screw convex head top to said automatic-water-shedding three-dimensionally-adjustable tapping-screw convex head bottom,
said automatic-water-shedding three-dimensionally-adjustable tapping-screw convex head bottom is for
providing a curved surface to three-dimensionally adjust automatic-water-shedding three-dimensionally-adjustable tapping-screw system thereon,
said automatic-water-shedding three-dimensionally-adjustable tapping-screw water-sealing ridge is for
preventing water from flowing into said automatic-water-shedding height-adjustable tube-screw central shaft,
said automatic-water-shedding three-dimensionally-adjustable tapping-screw shank
is for
being inserted through automatic-water-shedding height-adjustable tube-screw central shaft, and
being screwed into a foundation,
said automatic-water-shedding height-adjustable tube-screw concave head top
is for
providing a curved surface to three-dimensionally adjust said automatic-water-shedding three-dimensionally-adjustable tapping-screw systems thereon,
said automatic-water-shedding height-adjustable tube-screw head body
is for
connecting said automatic-water-shedding height-adjustable tube-screw concave head top to said automatic-water-shedding height-adjustable tube-screw convex head bottom,
said automatic-water-shedding height-adjustable tube-screw water-sealing dike
is for
preventing water from flowing into said automatic-water-shedding height-adjustable tube-screw central shaft,
said automatic-water-shedding height-adjustable tube-screw water reservoir
is for
directing water into said automatic-water-shedding height-adjustable tube-screw water reservoir channels,
said automatic-water-shedding height-adjustable tube-screw water reservoir channels
are for
directing water into said automatic-water-shedding height-adjustable three-dimensionally-adjustable base water reservoirs,
said automatic-water-shedding height-adjustable tube-screw water-sealing ridge
is for
preventing water from flowing into said automatic-water-shedding height-adjustable three-dimensionally-adjustable base-screw holes,
said automatic-water-shedding height-adjustable tube-screw shank
is for
being screwed into said automatic-water-shedding height-adjustable three-dimensionally-adjustable base-screw holes,
said automatic-water-shedding height-adjustable tube-screw thread
is for
being screwed on said automatic-water-shedding height-adjustable three-dimensionally-adjustable base threads,
said automatic-water-shedding height-adjustable tube-screw central shaft
is for
said automatic-water-shedding three-dimensionally-adjustable tapping-screw shank to be inserted therethrough,
said automatic-water-shedding height-adjustable tube-screw locking teeth
are for
biting into a foundation to secure said automatic-water-shedding height-adjustable tube-screw systems,
said automatic-water-shedding height-adjustable three-dimensionally-adjustable base dikes are for
preventing water from flowing into said automatic-water-shedding height-adjustable three-dimensionally-adjustable base-screw holes, said automatic-water-shedding height-adjustable three-dimensionally-adjustable base water reservoirs are for
directing water into said automatic-water-shedding height-adjustable three-dimensionally-adjustable base water-collecting sump, said automatic-water-shedding height-adjustable three-dimensionally-adjustable base water-collecting sumps are for
directing water into said automatic-water-shedding height-adjustable three-dimensionally-adjustable base sump ducts, said automatic-water-shedding height-adjustable three-dimensionally-adjustable base sump ducts are for
draining water away from said automatic-water-shedding height-adjustable three-dimensionally-adjustable base system, said automatic-water-shedding height-adjustable three-dimensionally-adjustable base-screw holes are for
said automatic-water-shedding height-adjustable tube-screw system to be screwed therein, said water-evaporation-inducing-and-water-draining-inducing pads
are for:
lifting said automatic-water-shedding height-adjustable three-dimensionally-adjustable base system up from the foundation to automatically allow water to evaporate away, said post-screw holes
are for
said post screws to be screwed therethrough, and said post screws
are for
screwing through said post-screw holes, whereby
the automatic-water-shedding height-adjustable three-dimensionally-adjustable fence-post-base system:
can adjust its elevation,
can three-dimensionally adjust its angle,
can remain perpendicular to the ground,
can allows air to freely circulate therethrough,
can drain water away therefrom,
can allow water to evaporate therethrough,
can bite into the ground,
can provide a solid, adjustable, four-point, permanent connection,
can prevent water from getting thereon,
can prevent its accelerated corrosion,
can prevent the accelerated corrosion of the ground,
can prevent the growth of mold, and mildew, and
can eliminate unhealthy environment.

2. The automatic-water-shedding height-adjustable three-dimensionally-adjustable fence-post-base system of claim 1, wherein, said automatic-water-shedding height-adjustable three-dimensionally-adjustable base system is perpendicular to the ground.

3. The automatic-water-shedding height-adjustable three-dimensionally-adjustable fence-post-base system of claim 1, wherein, said automatic-water-shedding height-adjustable three-dimensionally-adjustable base system is at an angle to the ground.

4. The automatic-water-shedding height-adjustable three-dimensionally-adjustable fence-post-base system of claim 1, wherein, said automatic-water-shedding three-dimensionally-adjustable tapping-screw water-sealing ridge has a ring shape.

5. The automatic-water-shedding height-adjustable three-dimensionally-adjustable fence-post-base system of claim 1, wherein, said automatic-water-shedding height-adjustable tube-screw water-sealing dike has a ring shape.

6. The automatic-water-shedding height-adjustable three-dimensionally-adjustable fence-post-base system of claim 1, wherein, said automatic-water-shedding height-adjustable tube-screw rain-water reservoir has a ring shape.

7. The automatic-water-shedding height-adjustable three-dimensionally-adjustable fence-post-base system of claim 1, wherein, said automatic-water-shedding height-adjustable three-dimensionally-adjustable base dikes each has a ring shape.

8. The automatic-water-shedding height-adjustable three-dimensionally-adjustable fence-post-base system of claim 1, wherein, said water-evaporation-inducing-and-water-draining-inducing pads each has a half-globe shape.

9. The automatic-water-shedding height-adjustable three-dimensionally-adjustable fence-post-base system of claim 1, wherein, said automatic-water-shedding three-dimensionally-adjustable tapping-screw systems, said automatic-water-shedding height-adjustable tube-screw systems, and said automatic-water-shedding height-adjustable three-dimensionally-adjustable base system is each made of a material selected from the group consisting of:
metal, metallic composite, plastic, and plastic composite.

10. An automatic-water-shedding fence-post-base system comprising:
automatic-water-shedding tapping-screw systems, each of said automatic-water-shedding tapping-screw systems comprising:
an automatic-water-shedding tapping-screw convex head top,
an automatic-water-shedding tapping-screw head body,
an automatic-water-shedding tapping-screw convex head bottom,
an automatic-water-shedding tapping-screw driver slot,
an automatic-water-shedding tapping-screw water-sealing ridge,
an automatic-water-shedding tapping-screw shank,
an automatic-water-shedding tapping-screw thread, and
an automatic-water-shedding tapping-screw drilling tip;

automatic-water-shedding tube-screw systems, each of said automatic-water-shedding tube-screw systems comprising:
an automatic-water-shedding tube-screw concave head top,
an automatic-water-shedding tube-screw head body,
an automatic-water-shedding tube-screw convex head bottom,
an automatic-water-shedding tube-screw water-sealing dike,
an automatic-water-shedding tube-screw water reservoir,
automatic-water-shedding tube-screw water reservoir channels,
an automatic-water-shedding tube-screw water-sealing ridge,
an automatic-water-shedding tube-screw shank,
an automatic-water-shedding tube-screw thread, and
automatic-water-shedding tube-screw locking teeth; and automatic-water-shedding base system, said automatic-water-shedding base system comprising:
an automatic-water-shedding concave base top,
an automatic-water-shedding base body,
an automatic-water-shedding base bottom,
automatic-water-shedding base threads,
automatic-water-shedding base dikes,
automatic-water-shedding base water reservoirs,
automatic-water-shedding base water-collecting sumps,
automatic-water-shedding base sump ducts,
automatic-water-shedding base-screw holes,
water-evaporation-inducing pads,
post-screw holes, and
post screws,
wherein
said automatic-water-shedding tapping-screw convex head top
is molded to said automatic-water-shedding tapping-screw head body,
said automatic-water-shedding tapping-screw head body
is molded to said automatic-water-shedding tapping-screw convex head bottom,
said automatic-water-shedding tapping-screw convex head bottom is molded to said automatic-water-shedding tapping-screw shank,
said automatic-water-shedding tapping-screw driver slot
is molded into said automatic-water-shedding tapping-screw convex head top,
said automatic-water-shedding tapping-screw water-sealing ridge is molded into said automatic-water-shedding tapping-screw head body,
said automatic-water-shedding tapping-screw shank
is molded to said automatic-water-shedding tapping-screw head body,
said automatic-water-shedding tapping-screw thread
is molded to said automatic-water-shedding tapping-screw shank,
said automatic-water-shedding tapping-screw drilling tip
is molded to said automatic-water-shedding tapping-screw shank,
said automatic-water-shedding tube-screw concave head top
is molded to said automatic-water-shedding tube-screw head body,
said automatic-water-shedding tube-screw head body
is molded to said automatic-water-shedding tube-screw convex head bottom,
said automatic-water-shedding tube-screw convex head bottom
is molded to said automatic-water-shedding tube-screw shank,
said automatic-water-shedding tube-screw water-sealing dike
is molded into said automatic-water-shedding tube-screw concave head top,
said automatic-water-shedding tube-screw water reservoir
is molded into said automatic-water-shedding tube-screw concave head top,
said automatic-water-shedding tube-screw water reservoir channels
are molded in said automatic-water-shedding tube-screw head body,
said automatic-water-shedding tube-screw water-sealing ridge
is molded to said automatic-water-shedding tube-screw head body,
said automatic-water-shedding tube-screw shank
is molded to said automatic-water-shedding tube-screw head body,
said automatic-water-shedding tube-screw thread
is molded to said automatic-water-shedding tube-screw shank,
said automatic-water-shedding tube-screw central shaft
is molded in said automatic-water-shedding tube-screw shank,
said automatic-water-shedding tube-screw locking teeth
are molded to said automatic-water-shedding tube-screw shank,
said automatic-water-shedding concave base top is molded to said automatic-water-shedding base body,
said automatic-water-shedding base body
is molded to said automatic-water-shedding base bottom,
said automatic-water-shedding base bottom
is molded to said automatic-water-shedding base body,
said automatic-water-shedding base threads
are molded in said automatic-water-shedding base body,
said automatic-water-shedding base dikes
are molded into said automatic-water-shedding concave base top,
said automatic-water-shedding base rain-water reservoirs are molded into said automatic-water-shedding concave base top,
said automatic-water-shedding base water-collecting sumps are molded in said automatic-water-shedding base body,
said automatic-water-shedding base sump ducts are molded in said automatic-water-shedding base body,
said automatic-water-shedding base-screw holes are molded in said automatic-water-shedding base body,
said water-evaporation-inducing pads
are molded to said automatic-water-shedding base bottom, and
said post-screw holes
are molded in said automatic-water-shedding base body,
wherein
said automatic-water-shedding tapping-screw convex head top
is for
automatically shedding water away,
said automatic-water-shedding tapping-screw head body
is for
connecting said automatic-water-shedding tapping-screw convex head top to said automatic-water-shedding tapping-screw convex head bottom,
said automatic-water-shedding tapping-screw convex head bottom is for
providing a curved surface to three-dimensionally adjust automatic-water-shedding tapping-screw system thereon,
said automatic-water-shedding tapping-screw water-sealing ridge is for
preventing water from flowing into said automatic-water-shedding tube-screw central shaft,
said automatic-water-shedding tapping-screw shank is for
- being inserted through automatic-water-shedding tube-screw central shaft,
- being screwed into a foundation, said automatic-water-shedding tube-screw concave head top
is for
- providing a curved surface to three-dimensionally adjust said automatic-water-shedding tapping-screw systems thereon, said automatic-water-shedding tube-screw head body
is for
- connecting said automatic-water-shedding tube-screw concave head top to said automatic-water-shedding tube-screw convex head bottom, said automatic-water-shedding tube-screw water-sealing dike
is for
- preventing water from flowing into said automatic-water-shedding tube-screw central shaft, said automatic-water-shedding tube-screw water reservoir
is for
- directing water into said automatic-water-shedding tube-screw water reservoir channels, said automatic-water-shedding tube-screw water reservoir channels
are for
- directing water into said automatic-water-shedding base water reservoirs, said automatic-water-shedding tube-screw water-sealing ridge
is for
- preventing water from flowing into said automatic-water-shedding base-screw holes, said automatic-water-shedding tube-screw shank
is for
- being screwed into said automatic-water-shedding base-screw holes, said automatic-water-shedding tube-screw thread
is for
- being screwed on said automatic-water-shedding three-dimensionally-adjustable base threads, said automatic-water-shedding tube-screw central shaft
is for
- said automatic-water-shedding tapping-screw shank to be inserted therethrough, said automatic-water-shedding tube-screw locking teeth
are for
- biting into the foundation to secure said automatic-water-shedding tube-screw systems, said automatic-water-shedding base dikes
are for
- preventing water from flowing into said automatic-water-shedding base-screw holes, said automatic-water-shedding base water reservoirs
are for
- directing water into said automatic-water-shedding base water-collecting sump, said automatic-water-shedding base water-collecting sumps are for
- directing water into said automatic-water-shedding base sump ducts, said automatic-water-shedding base sump ducts are for
- draining water away from said automatic-water-shedding base system, said automatic-water-shedding base-screw holes are for
- said automatic-water-shedding tube-screw system to be screwed therein, said water-evaporation-inducing pads
are for:
- lifting said automatic-water-shedding base system up from the foundation to automatically allow water to evaporate away, said post-screw holes
are for
- said post screws to be screwed therethrough, and said post screws
are for
- screwing through said post-screw holes.

11. The automatic-water-shedding fence-post-base system of claim 10, wherein, said automatic-water-shedding base system is perpendicular to the ground.

12. The automatic-water-shedding fence-post-base system of claim 10, wherein, said automatic-water-shedding base system is at an angle to the ground.

13. The automatic-water-shedding fence-post-base system of claim 10, wherein, said automatic-water-shedding tapping-screw water-sealing ridge has a ring shape.

14. The automatic-water-shedding fence-post-base system of claim 10, wherein, said automatic-water-shedding height-adjustable tube-screw water-sealing dike has a ring shape.

15. The automatic-water-shedding fence-post-base system of claim 10, wherein, said automatic-water-shedding tube-screw rain-water reservoir has a ring shape.

16. The automatic-water-shedding fence-post-base system of claim 10, wherein, said automatic-water-shedding height-adjustable three-dimensionally-adjustable base dikes each has a ring shape.

17. The automatic-water-shedding fence-post-base system of claim 10, wherein, said water-evaporation-inducing pads each has a half-globe shape.

18. The automatic-water-shedding fence-post-base system of claim 10, wherein, said automatic-water-shedding tapping-screw systems, said automatic-water-shedding tube-screw systems, and said automatic-water-shedding base system is each made of a material selected from the group consisting of: metal, metallic composite, plastic, and plastic composite.

19. An automatic-water-shedding fence-post-base system comprising:
- automatic-water-shedding tapping-screw systems, each of said automatic-water-shedding tapping-screw systems comprising:
  - an automatic-water-shedding tapping-screw convex head top,
  - an automatic-water-shedding tapping-screw head body,
  - an automatic-water-shedding tapping-screw convex head bottom,
  - an automatic-water-shedding tapping-screw driver slot,
  - an automatic-water-shedding tapping-screw water-sealing ridge,
  - an automatic-water-shedding tapping-screw shank,
  - an automatic-water-shedding tapping-screw thread, and
  - an automatic-water-shedding tapping-screw drilling tip;
- automatic-water-shedding tube-screw systems, each of said automatic-water-shedding tube-screw systems comprising:
  - an automatic-water-shedding tube-screw concave head top, an automatic-water-shedding tube-screw head body,
an automatic-water-shedding tube-screw convex head bottom,
an automatic-water-shedding tube-screw water-sealing dike,
an automatic-water-shedding tube-screw water reservoir,
automatic-water-shedding tube-screw water reservoir channels,
an automatic-water-shedding tube-screw water-sealing ridge,
an automatic-water-shedding tube-screw shank,
an automatic-water-shedding tube-screw thread, and
automatic-water-shedding tube-screw locking teeth; and
automatic-water-shedding base system, said automatic-water-shedding base system comprising:
an automatic-water-shedding concave base top,
an automatic-water-shedding base body,
an automatic-water-shedding base bottom,
automatic-water-shedding base threads,
automatic-water-shedding base dikes,
automatic-water-shedding base water reservoirs,
automatic-water-shedding base water-collecting sumps,
automatic-water-shedding base sump ducts,
automatic-water-shedding base-screw holes,
post-screw holes, and
post screws,
wherein
said automatic-water-shedding tapping-screw convex head top
is molded to said automatic-water-shedding tapping-screw head body,
said automatic-water-shedding tapping-screw head body
is molded to said automatic-water-shedding tapping-screw convex head bottom,
said automatic-water-shedding tapping-screw convex head bottom is molded to said automatic-water-shedding tapping-screw shank,
said automatic-water-shedding tapping-screw driver slot
is molded into said automatic-water-shedding tapping-screw convex head top,
said automatic-water-shedding tapping-screw water-sealing ridge is molded into said automatic-water-shedding tapping-screw head body,
said automatic-water-shedding tapping-screw shank
is molded to said automatic-water-shedding tapping-screw head body,
said automatic-water-shedding tapping-screw thread
is molded to said automatic-water-shedding tapping-screw shank,
said automatic-water-shedding tapping-screw drilling tip
is molded to said automatic-water-shedding tapping-screw shank,
said automatic-water-shedding tube-screw concave head top
is molded to said automatic-water-shedding tube-screw head body,
said automatic-water-shedding tube-screw head body
is molded to said automatic-water-shedding tube-screw convex head bottom,
said automatic-water-shedding tube-screw convex head bottom
is molded to said automatic-water-shedding tube-screw shank,
said automatic-water-shedding tube-screw water-sealing dike
is molded into said automatic-water-shedding tube-screw concave head top,
said automatic-water-shedding tube-screw water reservoir
is molded into said automatic-water-shedding tube-screw concave head top,
said automatic-water-shedding tube-screw water reservoir channels
are molded in said automatic-water-shedding tube-screw head body,
said automatic-water-shedding tube-screw water-sealing ridge
is molded to said automatic-water-shedding tube-screw head body,
said automatic-water-shedding tube-screw shank
is molded to said automatic-water-shedding tube-screw head body,
said automatic-water-shedding tube-screw thread
is molded to said automatic-water-shedding tube-screw shank,
said automatic-water-shedding tube-screw central shaft
is molded in said automatic-water-shedding tube-screw shank,
said automatic-water-shedding tube-screw locking teeth
are molded to said automatic-water-shedding tube-screw shank,
said automatic-water-shedding concave base top is molded to said automatic-water-shedding base body,
said automatic-water-shedding base body
is molded to said automatic-water-shedding base bottom,
said automatic-water-shedding base bottom
is molded to said automatic-water-shedding base body,
said automatic-water-shedding base threads
are molded in said automatic-water-shedding base body,
said automatic-water-shedding base dikes
are molded into said automatic-water-shedding concave base top,
said automatic-water-shedding base rain-water reservoirs are molded into said automatic-water-shedding concave base top,
said automatic-water-shedding base water-collecting sumps are molded in said automatic-water-shedding base body,
said automatic-water-shedding base sump ducts are molded in said automatic-water-shedding base body,
said automatic-water-shedding base-screw holes are molded in said automatic-water-shedding base body,
said water-evaporation-inducing pads
are molded to said automatic-water-shedding base bottom, and
said post-screw holes
are molded in said automatic-water-shedding base body,
wherein
said automatic-water-shedding tapping-screw convex head top
is for
automatically shedding water away,
said automatic-water-shedding tapping-screw head body is for
- connecting said automatic-water-shedding tapping-screw convex head top to said automatic-water-shedding tapping-screw convex head bottom, said automatic-water-shedding tapping-screw convex head bottom is for
- providing a curved surface to three-dimensionally adjust automatic-water-shedding tapping-screw system thereon, said automatic-water-shedding tapping-screw water-sealing ridge is for
- preventing water from flowing into said automatic-water-shedding tube-screw central shaft, said automatic-water-shedding tapping-screw shank is for
- being inserted through automatic-water-shedding tube-screw central shaft,
- being screwed into a foundation, said automatic-water-shedding tube-screw concave head top is for
- providing a curved surface to three-dimensionally adjust said automatic-water-shedding tapping-screw systems thereon, said automatic-water-shedding tube-screw head body is for
- connecting said automatic-water-shedding tube-screw concave head top to said automatic-water-shedding tube-screw convex head bottom, said automatic-water-shedding tube-screw water-sealing dike is for
- preventing water from flowing into said automatic-water-shedding tube-screw central shaft, said automatic-water-shedding tube-screw water reservoir is for
- directing water into said automatic-water-shedding tube-screw water reservoir channels, said automatic-water-shedding tube-screw water reservoir channels are for
- directing water into said automatic-water-shedding base water reservoirs, said automatic-water-shedding tube-screw water-sealing ridge is for
- preventing water from flowing into said automatic-water-shedding base-screw holes, said automatic-water-shedding tube-screw shank is for
- being screwed into said automatic-water-shedding base-screw holes, said automatic-water-shedding tube-screw thread is for
- being screwed on said automatic-water-shedding three-dimensionally-adjustable base threads, said automatic-water-shedding tube-screw central shaft is for
- said automatic-water-shedding tapping-screw shank to be inserted therethrough, said automatic-water-shedding tube-screw locking teeth are for
- biting into the foundation to secure said automatic-water-shedding tube-screw systems, said automatic-water-shedding base dikes are for
- preventing water from flowing into said automatic-water-shedding base-screw holes, said automatic-water-shedding base water reservoirs are for
- directing water into said automatic-water-shedding base water-collecting sump, said automatic-water-shedding base water-collecting sumps are for
- directing water into said automatic-water-shedding base sump ducts, said automatic-water-shedding base sump ducts are for
- draining water away from said automatic-water-shedding base system, said automatic-water-shedding base-screw holes are for
- said automatic-water-shedding tube-screw system to be screwed therein, said post-screw holes are for
- said post screws to be screwed therethrough, and said post screws are for
- screwing through said post-screw holes.

20. The automatic-water-shedding fence-post-base system of claim 19, wherein, said automatic-water-shedding base system is perpendicular to the ground.

* * * * *